(12) United States Patent
Cherkasova et al.

(10) Patent No.: US 8,046,765 B2
(45) Date of Patent: Oct. 25, 2011

(54) SYSTEM AND METHOD FOR DETERMINING ALLOCATION OF RESOURCE ACCESS DEMANDS TO DIFFERENT CLASSES OF SERVICE BASED AT LEAST IN PART ON PERMITTED DEGRADED PERFORMANCE

(75) Inventors: Ludmila Cherkasova, Fort Collins, CO (US); Jerome Rolia, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1491 days.

(21) Appl. No.: 11/492,376

(22) Filed: Jul. 25, 2006

(65) Prior Publication Data

US 2008/0028409 A1    Jan. 31, 2008

(51) Int. Cl.
*G06F 9/46* (2006.01)
(52) U.S. Cl. ...................................... 718/104
(58) Field of Classification Search .............. 718/104
See application file for complete search history.

(56) References Cited

U.S. PATENT DOCUMENTS

| | | | |
|---|---|---|---|
| 5,408,663 A | 4/1995 | Miller | |
| 5,598,532 A | 1/1997 | Liron | |
| 6,141,686 A | 10/2000 | Jackowski et al. | |
| 6,721,796 B1 | 4/2004 | Wong | |
| 6,745,221 B1 | 6/2004 | Ronca | |
| 7,395,537 B1 * | 7/2008 | Brown et al. ............. | 718/104 |
| 2002/0010771 A1 * | 1/2002 | Mandato ................. | 709/223 |
| 2003/0139918 A1 * | 7/2003 | Hardwick et al. .......... | 703/22 |
| 2005/0102393 A1 * | 5/2005 | Murray et al. ............ | 709/224 |
| 2005/0259683 A1 * | 11/2005 | Bishop et al. ............ | 370/468 |

OTHER PUBLICATIONS

U.S. Appl. No. 11/070,602, filed Mar. 2, 2005.
U.S. Appl. No. 11/070,605, filed Mar. 2, 2005.
U.S. Appl. No. 11/070,674, filed Mar. 2, 2005.
U.S. Appl. No. 11/134,681, filed May 19, 2005.
"XEN the XEN virtual machine monitor", University of Cambridge, [online] Retrieved on Feb. 21, 2005—1 page Retrieved from: http://www.cl.cam.ac.uk/Research/SRG/netos/xen/downloads.html.
Kallahalla, M. et al., "SoftUDS: A Software-Based Center for Utility Computing", 2004 IEEE, Published by the IEEE Computer Society, pp. 38-46.
Barham, P. et al., "Xen and the Art of Virtualization", University of Cambridge Computer Laboratory, SOSP Oct. 19, 2003, 14 pages.
Fraser, K. et al., "Reconstructing I/O", a Technical Report, Aug. 2004 [online], 16 pages Retrieved from: http://www.cl.cam.ac.uk/TechReports/UCAM-CL-TR-596.pdf.

* cited by examiner

*Primary Examiner* — Meng An
*Assistant Examiner* — Blake Kumabe

(57) ABSTRACT

A method comprises receiving into a planning tool a representative workload for a consumer. The method further comprises receiving into the planning tool quality of service desires of the consumer which define permitted degraded performance. In certain embodiments, the permitted degraded performance is time-limited wherein demands of the representative workload may exceed a pre-defined utilization constraint for at least one resource servicing the demands for no more than a pre-defined amount of contiguous time. The planning tool determines an allocation of demand of the consumer for each of a plurality of different classes of service (COSs). In certain embodiments, a first COS provides guaranteed resource access for servicing demand allocated thereto, and a second COS provides non-guaranteed resource access for servicing demand allocated thereto. In certain embodiments, the allocation of demand to the different COSs may be determined for both a normal mode and a failure mode of operation.

22 Claims, 8 Drawing Sheets

SYSTEM AND METHOD FOR DETERMINING ALLOCATION OF RESOURCE ACCESS DEMANDS TO DIFFERENT CLASSES OF SERVICE BASED AT LEAST IN PART ON PERMITTED DEGRADED PERFORMANCE

CROSS-REFERENCE TO RELATED APPLICATIONS

The present application is related to the following and commonly assigned U.S. patent applications: Ser. No. 11/134,681 filed May 19, 2005 titled "SYSTEM AND METHOD FOR DETERMINING A PARTITION OF A CONSUMER'S RESOURCE ACCESS DEMANDS BETWEEN A PLURALITY OF DIFFERENT CLASSES OF SERVICE," now U.S. Patent Publication No. 2006/0265470; Ser. No. 11/070,602 filed Mar. 2, 2005 titled "SYSTEM AND METHOD FOR ATTRIBUTING CPU USAGE OF A VIRTUAL MACHINE MONITOR TO A CORRESPONDING VIRTUAL MACHINE," now U.S. Patent Publication No. 2006/0200819; Ser. No. 11/070,605 filed Mar. 2, 2005 titled "SYSTEM AND METHOD FOR ATTRIBUTING TO A CORRESPONDING VIRTUAL MACHINE CPU USAGE OF A DOMAIN IN WHICH A SHARED RESOURCE'S DEVICE DRIVER RESIDES," now U.S. Pat. No. 7,797,707; and Ser. No. 11/070,674 filed Mar. 2, 2005 titled "SYSTEM AND METHOD FOR ATTRIBUTING TO A CORRESPONDING VIRTUAL MACHINE CPU USAGE OF AN ISOLATED DRIVER DOMAIN IN WHICH A SHARED RESOURCE'S DEVICE DRIVER RESIDES," now U.S. Pat. No. 7,779,424, the disclosures of which are hereby incorporated herein by reference.

FIELD OF THE INVENTION

The following description relates generally to managing access to resources, and more specifically to systems and methods for determining a partition of a consumer's resource access demands between a plurality of different classes of service.

DESCRIPTION OF RELATED ART

Resource pools are collections of computing resources, such as clusters of servers, racks of blades, or other computing resources. The utility data center (UDC) available from Hewlett-Packard Company is one example of a resource pool. Depending on the granularity of a given implementation, a resource pool may be a collection of separate computing devices (e.g., separate servers, separate clusters of servers, etc.) or it may be a collection of resources on a common computing device (e.g., multiple processors on a single server). Various types of resource pools are known, and techniques have been developed for managing access to such resource pools. For instance, virtualization services have been developed that offer interfaces that support the lifecycle management (e.g., create, destroy, move, size capacity) of resource containers (e.g., virtual machines, virtual disks) that provide access to shares of capacity. Various consumers (e.g., applications) may share access to the resources of a resource pool. That is, various consumers may share utilization of the resources in a resource pool for servicing their respective workloads. In this sense, a "consumer" refers to anything (e.g., process, etc.) that consumes capacity of the pool's resources. A consumer generally consumes capacity for use in servicing the consumer's workload. Thus, the consumer has a "demand" for capacity from the resource pool for servicing its workload in a desired manner. In some implementations, workloads are assigned to the resource containers which are then associated with resources. A "computing resource," as used herein, refers to any resource now known or later developed that a consumer utilizes in servicing a workload, including without limitation processing resources (e.g., CPUs), data storage resources (e.g., memory, hard drive, etc.), communication resources (e.g., communication ports, bandwidth, etc.), and input/output (I/O) resources, as examples. Resources in a pool have capacity attributes, e.g., CPU, memory, I/O operation rates, and bandwidths, each with limited capacity.

To facilitate sharing of a resource pool's capacity between a plurality of consumers (e.g., a plurality of applications), some type of scheme for managing allocation of the pool's capacity among the consumers may be employed. Without such management of allocation, a given consumer may consume all or substantially all of the pool's capacity for servicing its workload, thus leaving the remaining consumers with insufficient capacity for supporting their respective workloads. Accordingly, consumers generally desire some assurance that they will be allocated sufficient capacity of the resource pool to enable the consumers to satisfy their respective quality of service (QoS) goals. As discussed further below, schedulers may be configured to allocate capacity of a resource pool among the consumers in an attempt to manage such allocation in a manner that provides some assurance that the consumers can satisfy their QoS goals (e.g., by balancing allocation among the consumers).

Each resource in a pool may have a scheduler that monitors its workloads' demands and dynamically varies the allocation of capacity, e.g., CPU, to the workloads, thereby managing the utilization of the resources by the various consumers. For instance, the scheduler may dynamically vary allocation of the pool's capacity in a manner that attempts to provide each consumer with access only to the capacity it needs (for servicing its current workload). As a workload's demand increases, the scheduler may increase the amount of the resource pool's capacity that is allocated to such workload; and as a workload's demand decreases, the scheduler may decrease its allocation of the resource pool's capacity to such workload.

Difficulty arises in determining how much capacity of a resource pool to allocate to various consumers for supporting their respective workloads. From a consumer's point of view, having maximum capacity allocated to it may be desirable because that ensures that the consumer has the maximum capacity available from the resource pool for servicing its workload. From a resource pool manager's point of view, however, it is often desirable to limit the amount of capacity allocated to each consumer, as this allows more cost effective utilization of the pool's resources by enabling greater capacity that is available to be used by other consumers. Thus, a balance may be struck in which a certain amount of capacity is allocated to a consumer that is believed to be sufficient to satisfy the consumer's quality of service (QoS) goals, while permitting remaining capacity to be allocated to other consumers. The scheduler for a resource pool may be configured to manage the allocation of the resource pool's capacity to consumers in a manner that achieves such a balance in accordance with defined allocation parameters.

In implementing an allocation management strategy, a scheduler may be utilized that is capable of implementing different priorities or "classes of service" (COSs) for demands of a consumer's workload. For instance, a first COS may be defined having a high priority and a second COS may be defined having a lower priority, wherein all the demands associated with the first COS may be allocated capacity to be satisfied first and any remaining capacity is then used to satisfy the demands of the second, lower priority COS. For example, demands for up to X amount of CPU utilization by a given consumer may be classified as a first COS having high priority (e.g., to which the consumer is "guaranteed" access) and any amount of CPU utilization by such consumer beyond the X amount at any given time is classified as a second COS having lower priority (e.g., in which the consumer has a non-guaranteed probability, such as a 0.8 probability, of receiving the desired CPU resources above X amount), wherein CPU capacity of the resource pool may be allocated for servicing the lower priority demand if available (e.g., if not needed for satisfying other consumer's higher priority demands) and is expected to have approximately 0.8 probability of being available when needed for the consumer.

While schedulers can be employed to manage allocation of a resource pool's capacity according to a plurality of different COSs in this manner, it is often unclear how to partition a consumer's workload demands across the various COSs. That is, consumers and/or resource pool managers have traditionally lacked the planning tools for intelligently determining a proper partitioning (or "classification") of the workload's demands among different COSs to achieve a resource allocation that is suitable for the consumer and resource pool. For instance, assuming a first COS provides access probability of 1 (or "guaranteed" access) to resources and a second COS provides probability of 0.8 access to the resources for satisfying the demands associated with such second COS (as in the above example), difficulty exists in determining a proper breakpoint for dividing a consumer's resource demands between such first and second COSs (e.g., the amount X in the above example). Traditionally, the consumer has little understanding of how a given breakpoint for dividing its demand between different COSs will affect its quality of service and thus has little understanding of whether such breakpoint is suitable. Similarly, a resource pool manager has little understanding of a proper breakpoint to use in dividing a consumer's resource demands between different COSs for a given consumer that would be sufficient for satisfying the consumer's QoS goals while also allowing cost effective utilization of the pool's resources. Thus, a desire exists for a planning tool that aids in determining a suitable partitioning of a consumer's workload demands across various COSs.

DETAILED DESCRIPTION

Figure 1:
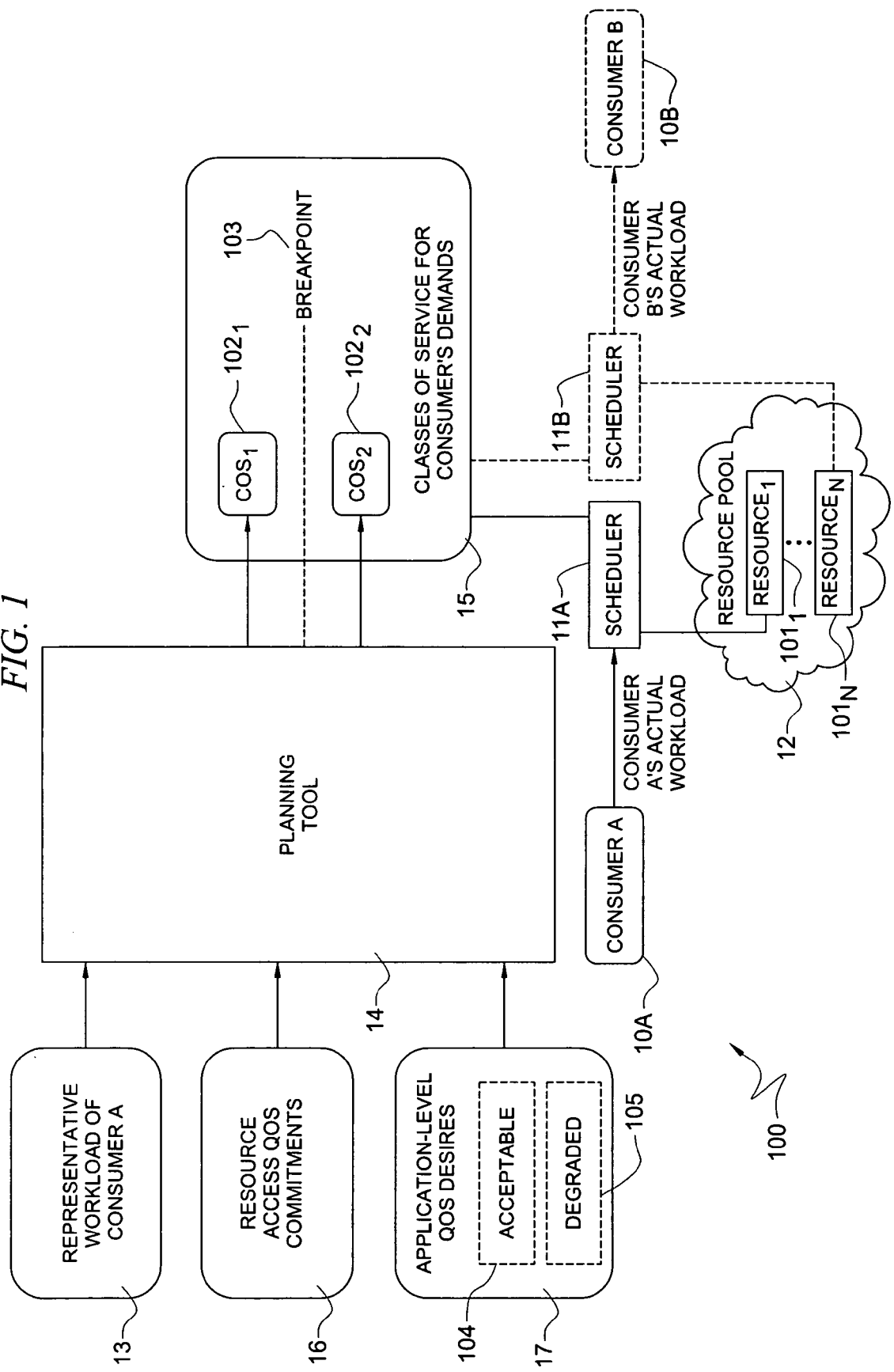
FIG. 1 shows an exemplary system employing one embodiment of the present invention.

As described further herein, exemplary techniques for partitioning demands of a consumer's workload into a plurality of different classes of service ("COSs") having different access priorities are described in U.S. patent application Ser. No. 11/134,681 filed May 19, 2005 titled "SYSTEM AND METHOD FOR DETERMINING A PARTITION OF A CONSUMER'S RESOURCE ACCESS DEMANDS BETWEEN A PLURALITY OF DIFFERENT CLASSES OF SERVICE," now U.S. Patent Publication No. 2006/0265470, the disclosure of which is incorporated herein by reference. In certain embodiments of the exemplary techniques described therein, a user (e.g., owner of a resource consuming application) can define certain constraints on resource utilization (e.g., an acceptable range for $U^{low}$ and $U^{high}$, which are also described further herein). Further, in certain embodiments of the exemplary techniques, a user (e.g., resource pool operator or owner of the consuming application) can define certain resource access QoS objectives (which may be referred to as resource access QoS "commitments") for resources in a resource pool, such as by defining a resource access probability ("$\theta$") for a non-guaranteed COS and/or a deadline s by which demands that are not satisfied upon request are to be satisfied. Such resource access QoS commitments may thus be used to determine a permitted amount of overbooking of the resources in the resource pool. The exemplary techniques described in U.S. patent application Ser. No. 11/134,681 filed May 19, 2005 titled "SYSTEM AND METHOD FOR DETERMINING A PARTITION OF A CONSUMER'S RESOURCE ACCESS DEMANDS BETWEEN A PLURALITY OF DIFFERENT CLASSES OF SERVICE," now U.S. Patent Publication No. 2006/0265470, may be used to determine classification of demands of the consumer for servicing the consumer's workload into a plurality of different COSs having different access priorities in a manner that satisfies the resource access QoS commitments and consumer QoS desires.

Embodiments of the present invention further enable a permitted degree of degraded performance to be defined for a consumer. That is, consumers often can quantify a permissible degree of degraded performance (e.g., performance that does not satisfy pre-defined constraints on resource utilization), and embodiments of the present invention enable such a permitted degree of degraded performance to be defined. According to certain embodiments, a time limit for the permitted degree of degraded performance is further defined, which specifies a length of contiguous time over which the degraded performance may be permissibly experienced. For instance, certain consumers may tolerate degraded performance (e.g., to enable increased number of workloads that may share service with a given resource pool) for a relatively short period of time (e.g., 10 minutes), but may not tolerate degraded performance for a longer period of time (e.g., 4 hours). Embodiments of the present invention enable such a permitted degree of time-limited degraded performance to be defined for a consumer, and such permitted degree of time-limited degraded performance is taken into consideration by a planning tool in determining placement of the consumer's workload to a proper resource pool (e.g., determining which resource pool the consumer's workload may be properly placed with other consumer workloads to effectively share the resource pool to satisfy their respective desires). In certain embodiments, the permitted degree of time-limited degraded performance is taken into consideration by a planning tool in determining a partition of demands of the consumer for servicing the consumer's workload into a plurality of different COSs having different access priorities in a manner that satisfies the resource access QoS commitments and consumer QoS desires. That is, the consumer QoS desires may include a defined permitted degree of time-limited degraded performance, which the planning tool takes into consideration in partitioning the consumer's workload into a plurality of different COSs.

FIG. 1 shows an exemplary system 100 employing one embodiment of the present invention. System 100 includes planning tool 14 that is operable to evaluate a consumer 10A's workload 13, as well as the consumer's QoS desires 17 and/or resource access QoS commitments 16, and determine a proper classification of the consumer 10A's demands among a plurality of different COSs 15, such as $COS_1$ $102_1$ and $COS_2$ $102_2$ in the illustrated example. That is, planning tool 14 is operable to determine a breakpoint 103 for dividing resource demands of consumer 10A between $COS_1$ $102_1$ and $COS_2$ $102_2$.

Planning tool 14 may be a software program stored to a computer-readable medium (e.g., memory, hard disk, optical disc, magnetic disk, or any other data storage device now known or later developed) and executing on a processor-based device, such as a personal computer (PC), laptop computer, server computer, etc. Of course, the functionality of planning tool 14 may be implemented in software, hardware, firmware, or any combination thereof. Thus, planning tool 14 may be employed as any type of planning logic, whether software, hardware, firmware, or any combination thereof.

As described further herein, in certain embodiments, planning tool 14 also receives resource access QoS commitments 16 for resources in a resource pool and QoS desires 17 of a consumer 10A, and uses this information in analyzing the consumer's workload 13 to classify the consumer's demands among the COSs in a manner that will satisfy the resource access QoS objectives and consumer's QoS desires. Embodiments of the present invention enable consumer QoS desires 17 to be defined via such parameters as acceptable QoS 104 and degraded QoS 105. For instance, as described further herein, a permitted degree of degraded performance, such as a permitted degree of time-limited degraded performance, may be defined for the consumer as degraded parameter(s) 105 in accordance with certain embodiments of the present invention. The degraded parameter(s) 105 may, for example, include a first parameter (e.g., the below-described $M^{degr}$ parameter) that specifies a percentage of demands in the workload that exceed a pre-defined resource utilization constraint, and a second parameter (e.g., the below-described $T^{degr}$ parameter) that specifies a limit on the amount of contiguous time that such degraded performance is permissible.

In certain embodiments, the consumer QoS desires 17 and/or resource access QoS commitments 16 may be defined for at least two different modes of operation: 1) a normal mode in which all resources in pool 12 are functional, and 2) a failure mode in which one or more resources have failed. Thus, a different consumer QoS desires 17 and/or resource access QoS commitments 16 that are permitted during times of resource failure may be defined and taken into consideration by planning tool 14 in performing workload placement (e.g., in determining a partition between different COSs for demands of the workload).

In certain embodiments, a scheduler 11A provides guaranteed access to resource $101_1$ for servicing the demands classified as $COS_1$, and the scheduler 11A provides non-guaranteed access to resource $101_1$ for servicing the demands classified as $COS_2$. Of course, in other embodiments, the priorities of the COSs may be implemented in any desirable manner. For instance, none of the COSs may provide guaranteed access, but they may be prioritized such that one COS provides greater probability of access than another COS. While two COSs, $COS_1$ and $COS_2$, are shown in FIG. 1, it should be understood that application of the concepts presented herein for classifying a consumer's demands are not limited to classification among two COSs but may likewise be applied for classifying demands among any number of different COSs. For instance, in certain implementations 3 COSs may be employed in which scheduler 11A provides high priority (e.g., guaranteed) access to resources for the demands classified in the first COS, lower priority access for the demands classified in the second COS, and even lower priority access for the demands classified in the third COS. Thus, while one breakpoint 103 is shown as determined in the example of FIG. 1 for ease of discussion, the concepts presented herein may be readily employed for determining any number of such breakpoints for classifying a consumer's demands in any number of different COSs.

In this embodiment, workload 13 is a representative workload of consumer 10A, which may be an actual historical workload collected for consumer 10A or a synthetic workload generated to represent the workload of consumer 10A, as examples. In one embodiment, workload 13 includes data identifying various time periods and the corresponding demands for resource access (e.g., CPU utilization) desired by consumer 10A. For instance, workload 13 may comprise a sequence of timestamps (which may be 5 seconds apart, 5 minutes apart, etc., depending on the appropriate time granularity for the environment/resource) and the corresponding resource utilization (e.g., CPU, I/O, network, or other resource utilization) for each timestamp.

Such workload 13 thus provides an estimation of the future workload expected for consumer 10A. For instance, a historical workload of, say, 3 months of usage of consumer 10A, may provide a good estimation of a future workload expected to be incurred by consumer 10A. Accordingly, by evaluating workload 13 for classifying the demands of consumer 10A encountered in such workload among $COS_1$ $102_1$ and $COS_2$ $102_2$, planning tool 14 provides a good classification of such demands that can be used going forward for managing future workloads of consumer 10A. The COSs 15 may then be used by scheduler 11A for managing access by consumer 10A to resource $101_1$ of a resource pool 12.

In certain embodiments, each resource $101_1, \ldots, 101_N$ in pool 12 may have a scheduler associated therewith that monitors its workloads' demands and dynamically varies the allocation of capacity, e.g., CPU, to the workloads aiming to provide each with access only to the capacity it needs. For instance, scheduler 11A is associated with resource $101_1$ for scheduling access thereto for consumers requesting access, such as consumer 10A. As also shown in the example of FIG. 1, a scheduler 11B may be associated with resource $101_N$ for scheduling access thereto for consumers requesting access, such as consumer 10B. Further, planning tool 14 may use a representative workload for consumer 10B, resource access QoS commitments, and the consumer's QoS desires for determining COSs to be used by scheduler 11B for consumer 10B's demands in the manner described further herein for consumer 10A.

As a workload's demand increases its allocation of resource capacity may increase, and as the workload's demand decreases its allocation of resource capacity may decrease. According to one embodiment, such schedulers may control the relationship between demand and allocation using a burst factor n, e.g., such that a workload's allocation will be approximately some real value n≧1 times its recent demand. In another embodiment, a scheduler may make use of several recent measurements to compute an allocation. Thus, while certain embodiments described further below make use of the notion of a burst factor, embodiments of the message-linking algorithm are not limited to determining allocations based on such burst factor may instead be implemented in a manner that is compatible with any of various other types of allocation algorithms.

The burst factor addresses the issue that allocations are adjusted using periodic utilization measurements. For instance, utilization measurements over an interval may be mean values that hide the bursts of demand within the interval. For instance, suppose an average demand over a time interval of 1 minute is determined by planning tool 14 from an analysis of workload 13; in this instance, such demand fails to indicate any bursts of demand that may have been encountered within the 1 minute interval, which may have greatly exceeded the average demand over the 1 minute interval. In general, the greater the workload variation and client population, the greater the potential for bursts in demand and the greater the need for a larger allocation relative to mean demand (i.e., utilization), and hence the need for a larger burst factor to ensure that sufficient resource capacity is allocated to the consumer to satisfy the bursts of demand. The product of mean demand and this burst factor estimates the true demand of the consumer at short time scales and is used for the purpose of allocation. Further, as mentioned above, scheduler 11A can implement at least two priorities with all the demands associated with the highest priority satisfied first. Any remaining capacity is then used to satisfy the demands of the next priority, and so on.

When hosting consumers (such as enterprise applications) in resource pool 12, the consumers often operate continuously and have unique time varying demands and performance oriented quality of service (QoS) objectives. The consumers can share individual resources, such as a CPU, or in some instances may demand many resources. An approach used in certain embodiments of the present invention for classifying the demands of the consumers is as follows. The resource pool operator decides on the resource access QoS objectives for two classes of service for resources in the resource pool. The first class of service is associated with the highest scheduling priority. The second is associated with the lower priority. Each consumer (e.g., application) owner specifies its consumer workload's QoS desire. This may be specified as a range for the burst factor, such as a range of values that correspond to ideal and simply adequate consumer QoS. As described further herein, in certain embodiments, the QoS desire may further express a degraded performance 105 that is permitted. Planning tool 14 receives this information and maps each consumer's workload demands onto the two classes of service. This mapping determines scheduling parameters for the workload.

In the above exemplary approach, the resource access QoS objectives specified by the resource pool operator govern the degree of overbooking in the resource pool 12. In one embodiment, the first COS offers guaranteed service. It corresponds to the scheduler 11A's high priority service. A capacity manager (not shown in FIG. 1) may be implemented to ensure that the sum of the demands associated with this first COS does not exceed the capacity of the resources in the resource pool 12. The second COS offers a lower QoS. It manages overbooking, i.e., statistical multiplexing, for each resource. Techniques are described further herein that may be employed by planning tool 14 for determining a suitable partitioning of a consumer's workload demands across a plurality of different COSs to realize application level performance oriented QoS objectives.

As described further herein, shared resource pool management is performed by planning tool 14 taking into account per-application QoS desires. In certain embodiments, the QoS desires may be defined for both normal and failure modes, and thus planning tool 14 may also take into consideration potential resource failures (e.g., server failures) in performing the capacity planning and resource allocation for a consumer's workload. In certain embodiments of the present invention, application QoS desires 17 are defined by complementary specifications for acceptable 104 and time-limited degraded 105 performance. Such specification defining a consumer's QoS desires 17 may be provided for both the normal case and for the case where one or more of resources 12 (e.g., an application server) fails.

Figure 2:
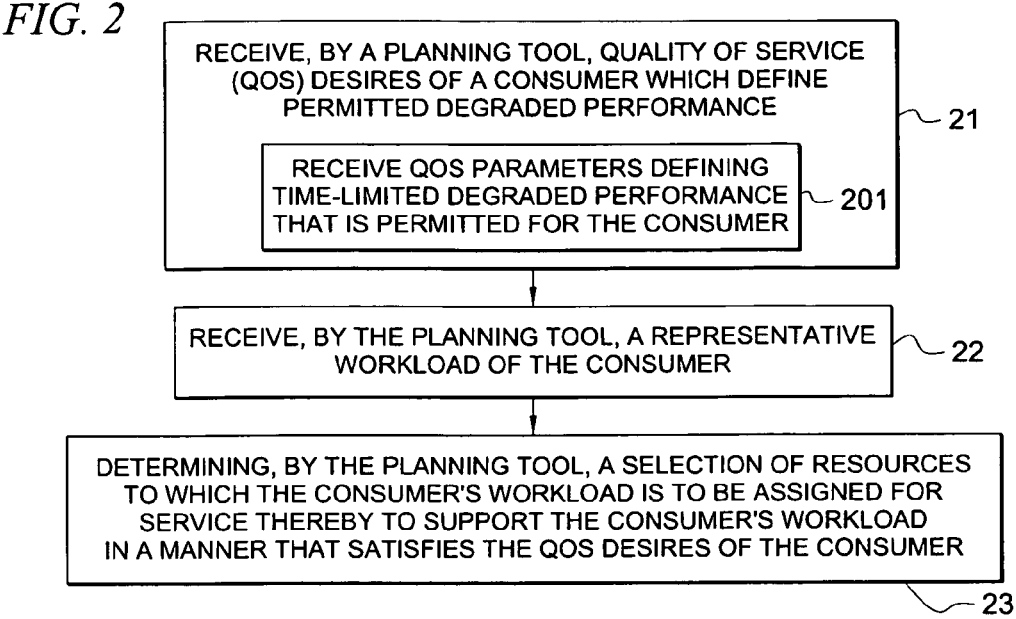
FIG. 2 shows an operational flow diagram of the planning tool of FIG. 1 according to one embodiment of the present invention.

Turning to FIG. 2, an exemplary operational flow diagram of planning tool 14 according to one embodiment of the present invention is shown. In operational block 21, the planning tool 14 receives QoS desires of a consumer which define permitted degraded performance, such as via permitted degraded performance parameter(s) 105 of FIG. 1. In certain embodiments, a user (e.g., owner of a resource consuming application) interacts with a user interface of planning tool 14 to input information defining such permitted degraded performance. In certain embodiments, such as shown in block 201, the planning tool 14 receives QoS parameter(s) defining time-limited degraded performance that is permitted for the consumer. For example, the user may input information specifying a first parameter (e.g., the below-described $M^{degr}$ parameter) that defines a permitted percentage of demands in the workload that may exceed a pre-defined resource utilization constraint, and a second parameter (e.g., the below-described $T^{degr}$ parameter) that defines a limit on the amount of contiguous time that such degraded performance is permissible.

In operational block 22, planning tool 14 receives a representative workload (e.g., workload 13 of FIG. 1) of the consumer. In block 23, the planning tool 14 determines a selection of resources to which the consumer's workload is to be assigned for service thereby to support the consumer's workload in a manner that satisfies the QoS desires of the consumer. For instance, the planning tool 14 may select which (e.g., how many) of the resources in pool 12 to which the consumer's application is to be assigned in order to satisfy the QoS desires of the consumer. As discussed further herein, in certain embodiments, the QoS desires are defined for both a normal mode and a failure mode, and the planning tool 14 determines (in block 23) the resources to which the consumer's application is to be assigned in order to satisfy the QoS desires for both modes. Also, as discussed further herein, in certain embodiments, the planning tool 14 determines a partition between different COSs for the demands of the consumer's representative workload in order to satisfy the QoS desires for the consumer.

Figure 3:
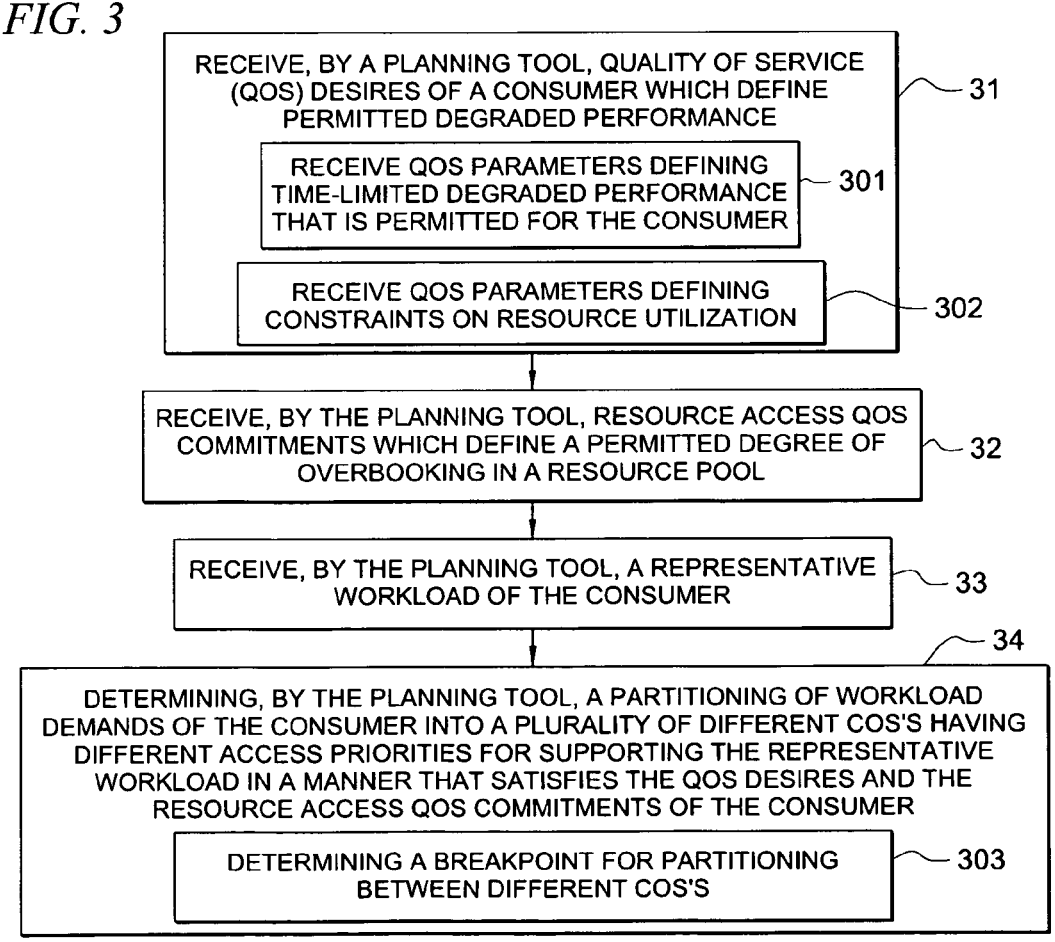
FIG. 3 shows an operational flow diagram of the planning tool of FIG. 1 according to another embodiment of the present invention.

Turning to FIG. 3, an exemplary operational flow of planning tool 14 according to another embodiment of the present invention is shown. In block 31, the planning tool 14 receives QoS desires 17 of a consumer which define permitted degraded performance. In this embodiment, the planning tool receives in block 301 QoS parameters defining time-limited degraded performance that is permitted for the consumer (e.g., parameters 105 of FIG. 1), and planning 14 receives in block 302 QoS parameters defining constraints on resource utilization (e.g., the below described $U^{low}$ and $U^{high}$ parameters).

In operational block 32, the planning tool 14 receives resource access QoS commitments 16 which define a permitted degree of overbooking in a resource pool. For instance, as described further below, such resource access QoS commitments 16 may include parameters defining a resource access probability ("θ") for a non-guaranteed COS (e.g., $COS_2$ $102_2$ of FIG. 1) and/or a deadline "s" by which demands that are not satisfied upon request are to be satisfied.

In block 33, planning tool 14 receives a representative workload (e.g., workload 13 of FIG. 1) of the consumer. In block 34, the planning tool 14 determines a partitioning of workload demands of the consumer into a plurality of different COSs having different access priorities for supporting the representative workload in a manner that satisfies the QoS desires and the resource access QoS commitments of the consumer. In certain embodiments, as shown in block 303, the planning tool 14 determines a breakpoint 103 for partitioning between different COSs in a manner that satisfies the QoS desires and the resource access QoS commitments of the consumer.

It should be recognized that consumer applications 10 (of FIG. 1) can make complex demands on resource pools 12. For example, many enterprise applications operate continuously, have unique time-varying demands, and have performance-oriented QoS objectives (or "desires"). Resource pool operators typically decide which workloads share specific resources and how workload managers should be configured to support each application. This is a challenging task because (i) the capacity of resource pools are generally overbooked (i.e., the sum of per-application peak demands are greater than the capacity of the pool), (ii) because different applications can have different QoS desires that are affected by the applications' ability to obtain capacity when needed, and (iii) because such pools may incur resource failures (i.e., resource pool operators typically desire a plan to deal with failures and ensure that their service level agreements remain satisfied).

To address the above challenges, an exemplary framework, which may be referred to as "R-Opus," is proposed by one embodiment of the present invention. Such framework supports capacity-as-a-service utilities using resource pools (e.g., of servers). The exemplary R-Opus framework is a composite framework with several features that include:

independently specified per-application QoS desires for normal and failure modes;

resource pool QoS commitments;

QoS translation that maps application resource demands to resource workload manager allocation priorities that implement resource pool classes of service (COS); and a workload placement service for normal and failure modes: the planning tool assigns application workloads to resources in the pool in a manner expected to satisfy the resource access QoS objectives for the pool.

In this exemplary embodiment, application QoS desires are defined by complementary specifications for acceptable and time-limited degraded performance and are specified for normal and failure modes. The workload placement service consolidates applications to a small number of resources while satisfying normal and then failure mode application QoS desires. In one implementation, the service reports whether a spare server is needed in case of a single node failure.

As mentioned above, the relationship between acceptable application QoS and system resource usage is complex. According to one embodiment of the present invention, an empirical approach is employed that aims to find an acceptable range for a "burst factor" (as described further herein) that relates workload demand to a scheduled allocation for resource (e.g., CPU) capacity. A stress testing exercise is used to submit a representative workload to the application in a controlled environment. Within the controlled environment, the burst factor that governs the relationship between application demand and allocation is varied, and is analyzed by the planning tool 14.

First, the planning tool 14 searches for the value of the burst factor that gives the responsiveness desired by application users (i.e., good but not better than necessary). Next, the planning tool 14 searches for the value of the burst factor that offers adequate responsiveness (i.e., a worse responsiveness would not be acceptable to the application users). These define an acceptable range of operation for the application on the resource and give a preferred range for the utilization of the allocation for a given application. Similarly, these values can be chosen or refined in operational environments.

Capacity management activities for resource pools may be performed over different timescales. Long term management corresponds to capacity planning; the goal here is to decide when additional capacity is needed for a pool so that a procurement process can be initiated. Over a medium timescale (e.g., weeks to months), groups of resource containers are chosen that are expected to share resources well. Each group is then assigned to corresponding resources. Assignments may be adjusted periodically as service levels are evaluated or as circumstances change (e.g., new applications must be supported; servers are upgraded, added, or removed). Once resource containers are assigned to a resource, a workload manager for the resource adjusts workload capacity allocations over short timescales based on time-varying workload demand. Finally, resource schedulers operate at the time-slice (sub-second) granularity according to these allocations. Adjustments to allocations in response to changing workloads can greatly increase the efficiency of the resource pool while providing a degree of performance isolation for the containers.

Resource workload managers are now briefly described in more detail. In general, a workload manager monitors its workload demands and dynamically adjusts the allocation of capacity (e.g., CPU) to the workloads, aiming to provide each with access only to the capacity it needs. When a workload demand increases, its allocation increases: similarly, when a workload demand decreases, its allocation decreases. Such managers can control the relationship between demand and allocation using a "burst factor"; a workload resource allocation is determined periodically by the product of some real value (the burst factor) and its recent demand. For example, if the measured utilization over the previous 5 minutes is 66% of 3 CPUs, then the demand is 2 CPU. A burst factor of 2 would cause an allocation in the next 5 minute interval of 4 CPUs. In this way, a burst factor guides the application toward a utilization of allocation of $$\frac{1}{\text{burst factor}}.$$

In other words, even though the application's allocation may vary over time, its utilization of allocation remains somewhat consistent.

The burst factor addresses the issue that allocations are adjusted using utilization measurements. In general, utilization measurements over any interval are mean values that hide the bursts of demand within the interval. The product of mean demand for an interval and this burst factor estimates the true demand of the application at short time scales and is used in this embodiment for the purpose of allocation. In general, the greater the workload variation and client population, the greater the potential for bursts in demand, the greater the need for a larger allocation relative to mean demand (i.e., utilization), and hence the greater the need for a larger burst factor.

In this exemplary embodiment, the workload manager implements two allocation priorities that correspond to the resource pool COS (e.g., $COS_1$ $102_1$ and $COS_2$ $102_2$ of FIG. 1). Demands associated with the higher priority (e.g., $COS_1$ $102_1$) are allocated capacity first; they correspond to the higher CoS. Any remaining capacity is then allocated to satisfy lower priority demands; this is the lower CoS. The exemplary R-Opus framework according to one embodiment uses these COS along with workload placement to manage application QoS.

In this embodiment, the workload placement service (e.g., of planning tool 14) employs a trace-based approach to model the sharing of resource capacity for resource pools. Each application workload is characterized using several weeks to several months of demand observations (e.g., with one observation every five minutes) for capacity attributes such as CPU, memory, and disk and network input-output. The general idea behind trace-based methods is that traces capture past demands and that future demands will be roughly similar. The trace-based representation of the workload's demands may be input to the planning tool 14 as representative workload 13 of FIG. 1.

In one embodiment, computer simulation is used by planning tool 14 for assigning multiple application workloads to a resource and estimating the resulting resource access QoS that is provided. Placements are found by planning tool 14 that satisfy resource access QoS commitments 16 for the historical data. It may be assumed, in this embodiment, that the resource access QoS will be similar in the near future. Though demands may change, for most applications they are likely to change slowly (e.g., over several months). Thus, by working with recent data (e.g., by including recent historical data in representative workload 13), planning tool 14 can periodically re-evaluate the representative workload and adapt to such a slow change. Significant changes in demand, due for instance to changes in business processes or application functionality, are best forecast by business units; they should be communicated to the operators of the resource pool so that their impact can be reflected in the corresponding traces.

Figure 4:
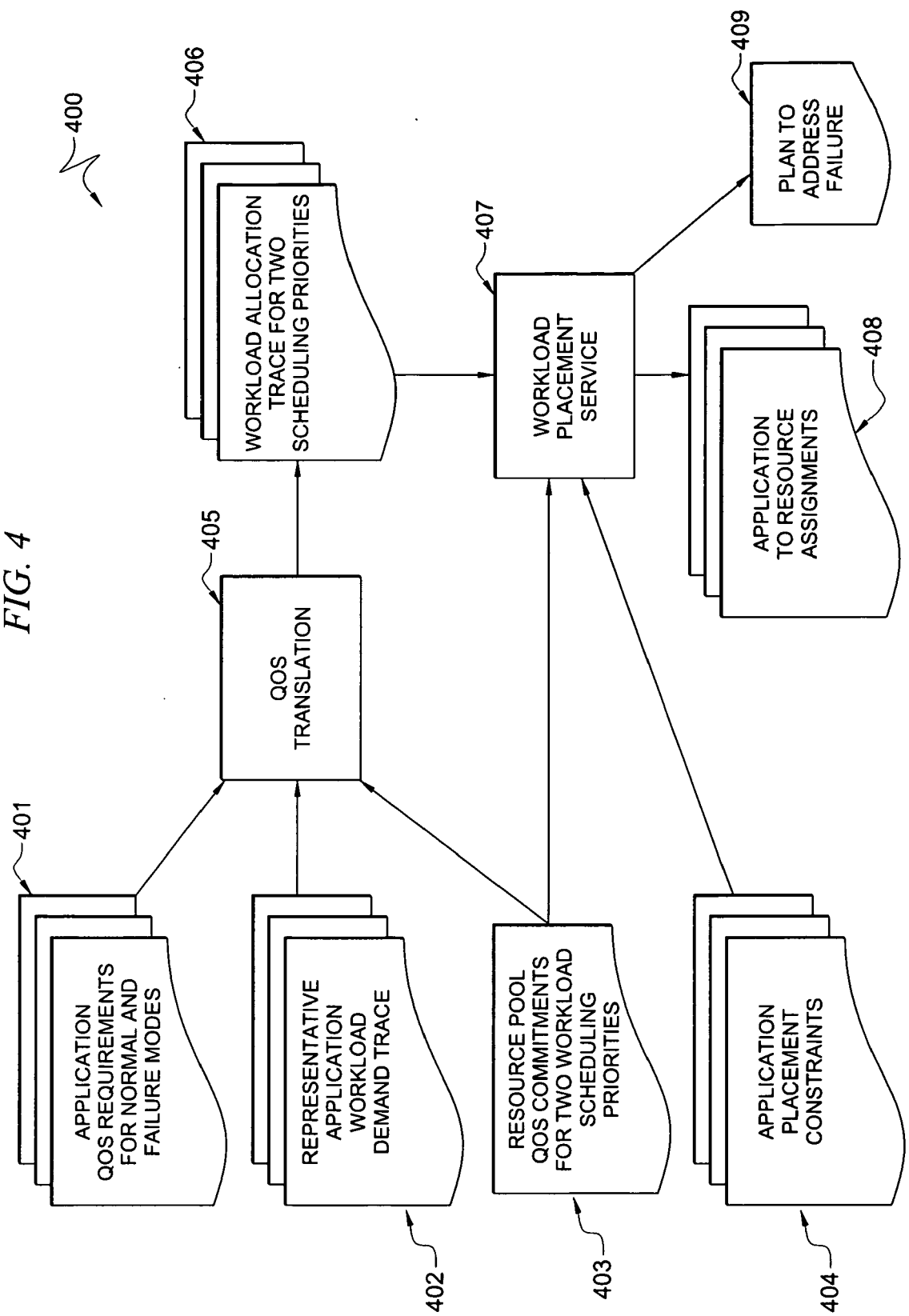
FIG. 4 shows a logical diagram illustrating the approach to capacity management of resource pools employed by an exemplary embodiment referred to herein as "R-Opus"

FIG. 4 shows a logical diagram 400 illustrating the approach of the exemplary R-Opus embodiment to capacity management for resource pools as supported by such workload managers and a workload placement service. As shown, a resource pool operator decides on resource access QoS commitments for two classes of services for resources in the resource pool, as QoS commitments specification 403. These specifications express the likelihood that a unit of capacity will be available when needed. For each application workload (e.g., each representative application workload demand trace 402), the application owner specifies, in QoS desires specification 401, its application's workload QoS desires as an acceptable range for the burst factor. The range corresponds to low and high utilization of allocation targets for the application. Furthermore, the application is permitted time-limited and bounded performance degradation beyond the range, e.g., a service level degradation, to account for spikes in demand that the application owner does not want to affect capacity sizing.

A QoS translation 405 (performed by planning tool 14) takes the independently specified application QoS desires 401 and the resource access QoS commitments 403 as input, and maps the application's workload demands 402 to allocations for the workload manager's two allocation priorities in a manner that assures the application QoS requirement will be satisfied as long as the resource pool offers the per-COS QoS it commits to. Thus, the mapping results in the workload allocation trace 406 for the two COS scheduling priorities.

Finally, over the medium term, the workload placement service 407 assigns application workload resource containers to resources in the pool (as in assignments 408) in a manner expected to satisfy the resource access QoS commitments for the two resource COSs in the pool. Such workload placement service 407 may based its placement assignment at least in part on predefined application placement constraints 404, which may be user-defined constraints regarding placement of the application's workload. Further, in certain embodiments, the workload placement service 407 determines a plan 409 for addressing resource failure to support QoS desires of the application under such failure mode in the manner described further herein.

The overall approach of this exemplary embodiment assumes that the analysis of application behavior as described in the traces is representative of future behavior. Historical data is relied on to forecast whether certain applications can co-exist on a resource while satisfying QoS requirements.

In one embodiment, each consumer desired QoS (e.g., QoS desire 17 of FIG. 1) is defined using a goal and constraints with respect to a range of utilization of allocation:

$U^{low}$—defines a utilization of allocation of that supports ideal application performance. Clearly, the utilization of allocation lower than $U^{low}$ also supports the ideal application performance, however at a price of underutilized (over-allocated) resources. Thus, in one embodiment, $$\frac{1}{U^{low}}$$

is used as a burst factor for determining the relationship between the demand and the desired ideal allocation.

$U^{high}$—represents a threshold on utilization of allocation beyond which the application performance would be undesirable to users.

$U^{degr}$—defines another threshold on utilization of allocation that can be used for coping with infrequent high bursts in demand. Typically, these occasional bursts of demand should not be used for determining the overall application's capacity desires, since they might lead to significant over-provisioning and increased configuration cost.

According to one embodiment of the present invention, an application owner can specify application QoS desires by stating his/her acceptable and degraded application performance. In certain embodiments, the owner specifies application QoS for two modes of operation: i) normal mode in which all planned resources are available; and ii) failure mode that corresponds to the case of 1-node failure (note that this scenario can be extended to multiple node failures). Thus, in certain embodiments, a consumer's QoS desires may be expressed as acceptable and degraded performance parameters, as follows:

acceptable performance: for at least M % of measurements, utilization of allocation $U^{alloc}$ should be within the desirable range, i.e., $U^{low} \leq U^{alloc} \leq U^{high}$; and degraded application performance: for the remaining measurements $M^{degr}=100\%-M\%$ the utilization of allocation should not exceed $U^{degr}$, i.e., $U^{high} \leq U^{alloc} \leq U^{degr}$.

Moreover, in certain embodiments, the degraded performance parameter further includes a time limit, $T^{degr}$, that specifies the maximum contiguous time when measured utilization of allocation $U^{alloc}$ may exceed $U^{high}$. That is, a consumer may, in defining degraded performance, not only specify a percentage of the workload that can fall into the degraded performance category, but can also specify the maximum period of contiguous time over which the degraded performance can be experienced by the workload. Additional constraints on the degraded performance, such as a constraint on the number of degraded epochs per time period (e.g., per day or week), may also be allowed to be defined by a consumer in certain embodiments of the present invention.

A time-limited degradation, $T^{degr}$, value relates the QoS desired specification to user experience. While application users may tolerate intermittent poor performance, e.g., for 5-10 minutes, sustained poor performance typically leads to user complaints. In certain embodiments of the present invention, the utilization of allocation for times of non-compliance is further bounded to $U^{degr}<1$ to ensure that, in this exemplary model, demands are satisfied within their measurement interval.

As one example, a consumer may define (e.g., via QoS desires 17 input to planning tool 14) the following application QoS desires: $U^{low}=0.5$, $U^{high}=0.66$, $M^{degr}=3\%$, $U^{degr}=0.9$, and $T^{degr}=30$ minutes. This states that based on the past history of application demands, the resource allocation schema is to be tailored (e.g., by planning tool 14) for this application to permit no more than $M^{degr}=3\%$ of measurements in the workload trace to have utilization of allocation above $U^{high}=66\%$. Additionally, these observations are not to have value greater than $U^{degr}=90\%$ and are not to exceed $U^{high}=0.66$ for more than $T^{degr}=30$ minutes at a time.

According to one embodiment, a representative workload 13 of the application (e.g., its historical demand values) is processed by planning tool 14 is transformed to time-varying allocation requirements for the resource pool 12 using the above-defined utilization of allocation values. The $M^{degr}$ and $T^{degr}$ terms limit the maximum allocation value for the application.

According to certain embodiments, the resource access QoS commitments 16 are specified by the resource pool operator and govern the degree of overbooking in the resource pool. In one embodiment, a first class of service (e.g., $COS_1$ $102_1$ of FIG. 1) offers guaranteed service. For each resource, the workload placement service (e.g., provided by planning tool 14) ensures that the sum of the per-application peak allocations associated with this first class of service does not exceed the capacity of the resource. In this embodiment, a second class of service (e.g., $COS_2$ $102_2$ of FIG. 1) offers a lower QoS. Further, in this embodiment, the second COS is associated with a resource access probability, $\theta$, that expresses the probability that a unit of resource capacity will be available for allocation when needed. The workload placement service (e.g., of planning tool 14) determines workload placements such that both constraints are satisfied. Thus, the workload placement service of one embodiment manages overbooking for each resource (i.e., statistical multiplexing).

A formal definition for a resource access probability $\theta$ according to one embodiment is as follows: Let C be the number of workload traces under consideration. Each trace has W weeks of observations with T observations per day as measured every m minutes. Without loss of generality, the notion of a week is used in this discussion as a timescale for service level agreements (of course, other timescales may be used if so desired). Time of day captures the diurnal nature of interactive enterprise workloads (e.g., those used directly by end users). Other time scales and patterns can also be used. Each of the T times of day, e.g., 8:00 am to 8:05 am, is referred to as a slot. Thus, for 5 minute measurement intervals, there are T=288 slots per day. Each slot is denoted using an index $1 \leq t \leq T$. Each day X of the seven days of the week has an observation for each slot t. Each observation has an allocation value for each of the capacity attributes considered in the analysis.

Without loss of generality, consider one class of service and one attribute that has a capacity limit of L units of demand. Let $A_{w,x,t}$ be the sum of the allocations upon the attribute by the C workloads for week W, day X and slot t. In one embodiment, the measured value for $\theta$ is defined as follows.

$$\theta = \min_{w=1}^{W} \min_{t=1}^{T} \frac{\sum_{T=1}^{7} \min(A_{w,x,t}, L)}{\sum_{x=1}^{7} A_{w,x,t}}$$

Thus, $\theta$ is reported (e.g., by planning tool 14) as the minimum resource access probability received any week for any of the T slots per day. Furthermore, in one embodiment, a COS constraint is defined as the combination of a required value for $\theta$ and a deadline s such that those demands that are not satisfied are satisfied within the deadline. Let L' be the required capacity for an attribute to support a COS constraint. A required capacity L' is the smallest capacity value, $L' \leq L$, to offer a probability $\theta'$ such that $\theta' \geq \theta$ and those demands that are not satisfied upon request, $A_{w,x,t}-L'>0$, are satisfied within the deadline. The deadline may be expressed as an integer number of slots s.

Further details regarding exemplary techniques for computing $\theta$ can be found in U.S. patent application Ser. No. 11/134,681 filed May 19, 2005 titled "SYSTEM AND METHOD FOR DETERMINING A PARTITION OF A CONSUMER'S RESOURCE ACCESS DEMANDS BETWEEN A PLURALITY OF DIFFERENT CLASSES OF SERVICE," now U.S. Patent Publication No. 2006/0265470, the disclosure of which is incorporated herein by reference.

An exemplary technique utilized by planning tool 14 for mapping an application's workload demands across two CoS to realize its application QoS objectives according to one embodiment of the present invention is now described. In this embodiment, the planning tool 14 takes as input a characterization of an application's workload demands on the resource (e.g., representative workload 13 of FIG. 1), the resource access QoS commitments for resources in the resource pool (e.g., QoS commitments 16 of FIG. 1), and the application-level QoS desires (e.g., QoS desires 17 of FIG. 1). The application-level QoS desires may be expressed using a range for the burst factor that corresponds to $U^{low}$ and $U^{high}$. As output, planning tool 14 describes how the application's workload demands should be partitioned across the pool's two classes of service (e.g., partitioned across $COS_1$ $102_1$ and $COS_2$ $102_2$ of FIG. 1).

The exemplary technique of one embodiment is motivated by portfolio theory which aims to construct a portfolio of investments, each having its own level of risk, to offer maximum expected returns for a given level of risk tolerance for the portfolio as a whole. The analogy is as follows: The resource access QoS commitments 16 quantify expected risks of resource sharing for the two COSs. These COSs correspond to potential investments with the lower COS having a greater return because the resource pool operator can provide a lower cost service when permitted to increase overbooking. The application demands (e.g., present in representative workload 13) represent investment amounts. They are partitioned across the CoSs so that application QoS remains in the tolerated range (as specified by QoS desires 17), which corresponds to the risk tolerance for the portfolio as a whole. By making greatest use of the lower COS (e.g., $COS_2$ $102_2$ of FIG. 1), this exemplary embodiments offers the resource pool operator the greatest opportunity to share resources and hence lower the cost to the application owner.

Thus, according to one embodiment, an application's workload demands may be partitioned across two classes of service, $COS_1$ and $COS_2$, to ensure that an application's utilization of allocation $U^{alloc}$ remains within the acceptable performance range: $U^{low} \leq U^{alloc} \leq U^{high}$. In this embodiment, $CoS_1$ offers guaranteed access to capacity. By associating part of the demands with $COS_1$, the resource access risk to the demands associated with $COS_2$ is limited. The resource access probability $\theta$ of $COS_2$ may be chosen by the resource pool operator. Consider, for example, three operating scenarios for a resource: (i) it has sufficient capacity to meet its current demands; (ii) demand exceeds supply but the resource is satisfying its resource access constraint; and (iii) demand exceeds supply and the resource is not satisfying its resource access constraint. This embodiment considers the first two scenarios and relies on workload placement techniques to avoid and react to the third scenario.

When the system has sufficient capacity, each application workload gets access to all the capacity it needs. In this case, the application's resource needs will all be satisfied and the application's utilization of allocation will be ideal, i.e. less than or equal to $U^{low}$.

In the case where demands exceed supply, the allocations associated with $COS_1$ are all guaranteed to be satisfied. However, the allocations associated with $COS_2$ are not guaranteed and will be offered with, at worst, the operator-specified resource access probability $\theta$. According to one embodiment of the present invention, the planning tool 14 aims to divide workload demands across these two classes of services while ensuring that the utilization of allocation remains in the acceptable range ($U^{low}$, $U^{high}$) defined above to satisfy the application's QoS requirements.

As an example, let p be a fraction of peak demand $D_{max}$ for the CPU attribute for the application workload that is associated with $COS_1$. The value $p \times D_{max}$ gives a breakpoint for the application workload such that all demand less than or equal to this value is placed in $COS_1$ and the remaining demand is placed in $COS_2$.

The range of acceptable allocations are thus between $$A_{ideal} = D_{max} \times \frac{1}{U^{low}} \text{ and } A_{ok} = D_{max} \times \frac{1}{U^{high}}.$$

So, the allocation for the lower but acceptable QoS offered to the application is: $A_{ok} = A_{ideal} \times p + A_{ideal} \times (1-p) \times \theta$. Solving this equation for p, provides the following (equation (1)):

$$p = \frac{\frac{U^{low}}{U^{high}} - \theta}{1 - \theta},$$

where $1 \geq \theta > 0$.

If $$\frac{U^{low}}{U^{high}} \leq \theta,$$

then p=0, i.e., all the demand can be associated with class $COS_2$. This provides desirable performance for utilization of allocation in the acceptable range ($U_{low}$, $U_{high}$). Thus, breakpoint p can be computed using the three basic parameters: bounds for acceptable utilization of allocation ($U_{low}$, $U_{high}$), and resource access probability $\theta$ for the second class of service $COS_2$.

Then, applying breakpoint p to the workload peak demand $D^{max}$, the maximum portion of demand that should be assigned to $COS_1$ can be computed as: $D_{CoS_1}^{max} = p \times D_{max}$.

Consider, for example, a current demand $D_{cur}$ from a received representative workload trace. In one embodiment, planning tool 14 partitions $D_{cur}$ across two classes of service: $COS_1$ and $COS_2$ as follows:

if $D_{cur} \leq D_{CoS_1}^{max}$, then it is assigned entirely to $COS_1$;

if $D_{cur} > D_{CoS_1}^{max}$, then demand $D_{cur}$ is split across two classes as follows:

a fraction of demand equal to $D_{CoS_1}^{max}$ is satisfied using $COS_1$, and the remaining part ($D_{cur} - D_{CoS_1}^{max}$) is satisfied using the second class of service $COS_2$.

According to embodiments, of the present invention, planning tool 14 further considers more complex application QoS desires that have a description of acceptable and degraded performance:

acceptable performance: for at least M % of measurements, utilization of allocation $U^{alloc}$ should be within the desirable range, i.e., $U^{low} \leq U^{alloc} \leq U^{high}$; and degraded application performance: for the remaining measurements $M^{degr} = 100\% - M \%$ the utilization of allocation should not exceed $U^{degr}$.

For example, let $D_M\%$ be a demand that corresponds to M-th percentile of the workload demands. For many workloads, $D_M\%$ is much smaller than $D_{100}\%$ for M %<100%. The condition for acceptable application performance is that the maximum allocation for a workload should be at least:

$$A_{ok} = \frac{D_{M\%}}{U^{high}}.$$

At the same time, the condition for degraded performance is that the maximum allocation for a workload should be at least:

$$A_{degr} = \frac{D_{max}}{U^{degr}}.$$

Thus, if $A_{ok} \geq A_{degr}$ then the allocation $A_{ok}$ provided by acceptable performance requirement (based on M-th percentile of workload demands) is also sufficient for assuring the degraded performance for the remaining $M^{degr}\%$ of the measurements. In this case, demand $D_M\%$ is used as a new maximum demand $D_{new\_max}$ that controls maximum allocation for a given workload as defined in the following equation ("equation (2)"): $D_{new\_max} = D_M\%$.

Therefore, according to one embodiment, all demands less than or equal to $p \times D_{new\_max}$ are placed in $COS_1$ and the remaining demands are placed in $COS_2$, where breakpoint p is computed by equation (1) defined above.

If $A_{ok} < A_{degr}$, then the allocation $A_{ok}$ provided by acceptable performance requirement (based on M-th percentile of workload demands) is not sufficient for providing degraded performance for the remaining $M^{degr}\%$ of the measurements. Hence, planning tool 14 uses allocation $A_{degr}$ as the maximum allocation, and computes a new maximum demand $D_{new\_max}$ that supports such an allocation according to the following equation ("equation (3)"):

$$D_{new\_max} = \frac{A_{degr}}{1/U^{high}} = \frac{D_{max} \times U^{high}}{U^{degr}}.$$

Using the above equation (3), planning tool 14 can evaluate an upper bound on potential capacity savings one can realize by weakening application QoS desires and allowing some percentage of points to be supported at degraded performance. The potential reduction in capacity, referred to herein as MaxCapReduction, can be computed according to the following equation ("equation (4)"):

$$MaxCapReduction = \frac{D_{max} - D_{new\_max}}{D_{max}}.$$

Using equation (3), we can replace $D_{new\_max}$ in equation (4) and express the upper bound on MaxCapReduction according to the following equation ("equation (5)"):

$$MaxCapReduction \leq \frac{D_{max} - \frac{D_{max} \times U^{high}}{U^{degr}}}{D_{max}} = 1 - \frac{U^{high}}{U^{degr}}.$$

Since equation (5) depends only on $U^{high}$ and $U^{degr}$, we can see that the upper bound for MaxCapReduction is the same for different values of $U^{low}$, $\theta$, and values used for M-th percentile. For example, if $U^{high}=0.66$ and $U^{degr}=0.9$, then potential MaxCapReduction=26.7%. This is an upper bound. Whether this maximum capacity reduction can be realized or not depends on the application workload as well as whether $A_{ok} < A_{degr}$.

Finally, when a degraded performance has an additional time-limiting constraint that $U^{alloc} \leq U^{degr}$ for no more than $T^{degr}$ contiguous minutes at a time, planning tool 14, according to this exemplary embodiment, performs a special trace analysis to verify this condition within the trace. For example, let there be R observations in $T^{degr}$ minutes. Suppose planning tool 14 discovers during the trace analysis that there are R+1 contiguous observations with utilization of allocation higher than $U^{high}$, i.e., they have degraded performance. In order to support time-limiting constraint on degraded performance, we need to "break" this continuous "degraded performance" sequence by supporting at least one of these demands at acceptable performance range, i.e., for one of those demands planning tool 14 increases its allocation so that its utilization is less or equal to $U^{high}$.

For instance, let $D_{min\_degr}$ be the smallest demand among considered R+1 contiguous measurements. The current maximum allocation for the overall workload is based on demand $D_{new\_max}$ that is computed using equation (2) or (3) described above. Since planning tool 14 is to increase the current maximum allocation for $D_{min\_degr}$, it recomputes a value for $D_{new\_max}$ in such a way that a new allocation for $D_{min\_degr}$ based on a recomputed $D_{new\_max}$ has its utilization of allocation not greater than $U^{high}$.

As one example of application of this embodiment, the planning tool 14 computes the allocation that currently is assigned for demand $D_{min\_degr}$. According to the exemplary portfolio approach of this embodiment, demand $D_{min\_degr}$ is split across two classes of services $COS_1$ and $COS_2$, where the fraction of demand assigned to $COS_1$ is defined by ("equation (6)"):

$$D_{CoS_1}^{min\_degr} = p \times D_{new\_max}; \text{ and}$$

the fraction of demand assigned to $COS_2$ is defined by ("equation (7)"):

$$D_{CoS_2}^{min\_degr} = D_{new\_max} - p \times D_{new\_max}.$$

It should be noted that if $D_{min\_degr} < D_{new\_max}$ then $D_{CoS_2}^{min\_degr} = D_{min\_degr} - p \times D_{new\_max}$. However, when $D_{min\_degr} > D_{new\_max}$, demand $D_{new\_max}$ is enforcing a limiting cap on the maximum allocation, and $D_{CoS_2}^{min\_degr} = D_{new\_max} - p \times D_{new\_max}$. In this way, the overall allocation $A_{min\_degr}$ provided for demand $D_{min\_degr}$ is computed in this embodiment according to the following ("equation (8)"):

$$A_{min\_degr} = \left(D_{CoS_1}^{min\_degr} + D_{CoS_2}^{min\_degr} \times \theta\right) \times \frac{1}{U_{low}}.$$

In one embodiment, planning tool 14 uses $A_{min\_degr}$ to recompute a value for $D_{new\_max}$ such that the utilization of a new allocation for $D_{min\_degr}$, based on this recomputed $D_{new\_max}$, is less or equal to $U^{high}$ according to the following ("equation (9)"):

$$U^{high} = \frac{D_{min\_degr}}{A_{min\_degr}}.$$

By replacing $A_{min\_degr}$ in equation (9) with equation (8), and by replacing $D_{CoS_1}^{min\_degr}$ and $D_{CoS_2}^{min\_degr}$ using equations (6) and (7), we have:

$$U^{high} = \frac{D_{min\_degr} \times U_{low}}{p \times D_{new\_max} + (D_{new\_max} - p \times D_{new\_max}) \times \theta}.$$

By solving this equation relative to $D_{new\_max}$, we find ("equation (10)"):

$$D_{new\_max} = \frac{D_{min\_degr} \times U_{low}}{U_{high} \times (p \times (1-\theta) + \theta)}.$$

According to one embodiment, planning tool 14 continues this trace analysis iteratively until it finds a new $D_{new\_max}$ that satisfies the additional time-limiting constraint on degraded performance for the entire workload. It should be noted that if p>0 then equation (10) has a very simple outcome: $D_{new\_max}=D_{min\_degr}$. If p=0, i.e., all the demand is associated with class of service $COS_2$, then equation (10) can be transformed as follows ("equation (11)"):

$$D_{new\_max} = \frac{D_{min\_degr} \times U_{low}}{U_{high} \times \theta}.$$

Suppose, for example, that the values $U_{low}$ and $U_{high}$ are fixed. The outcome of equation (10) strongly depends on resource access probability $\theta$ for $COS_2$. Higher values of $\theta$ lead to a smaller $D_{new\_max}$ because the higher values of $\theta$ imply a lower risk for class of service $COS_2$. Since $D_{new\_max}$ limits and controls the maximum allocation per application, smaller values of $D_{new\_max}$ lead to smaller capacity requirements on the resource pool. Thus, we have shown that if there are time-limiting constraints on degraded performance, then higher values of $\theta$ may result in the smaller maximum allocation per application.

Figure 5:
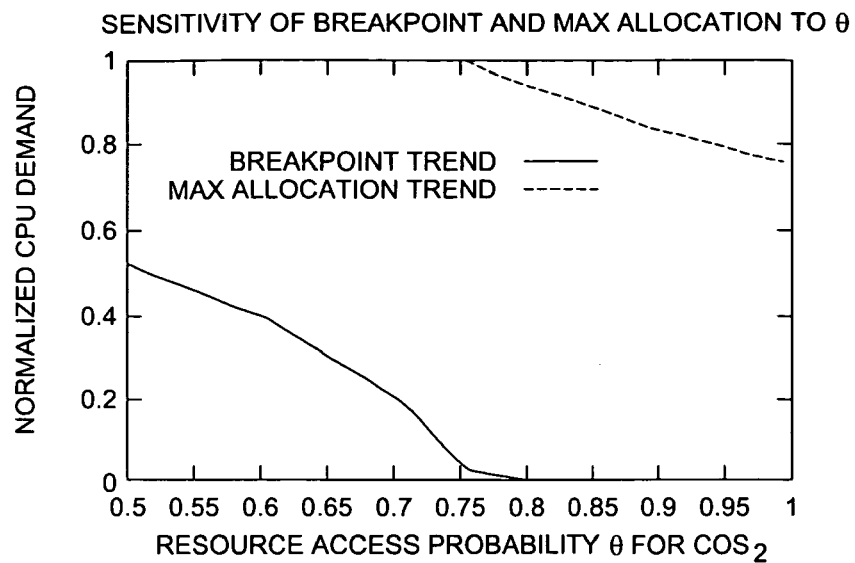
FIG. 5 shows the impact of $\theta$ on breakpoint p and maximum allocation per application according to one exemplary case study.

FIG. 5 shows the impact of $\theta$ on breakpoint p (where p defines a fraction of demand that is assigned to $COS_1$) and maximum allocation per application according to one exemplary case study. In this example, we used ($U_{low}$, $U_{high}$)=(0.5, 0.66) as an acceptable performance range. The plot shows the trend for $D_{new\_max}$ in a normalized way: the ratio of any two points on the line approximates the ratio in $D_{new\_max}$ per application for different values of $\theta$. For example, it shows that for $\theta$=0.95 the maximum demand $D_{new\_max}$ is 20% lower than for $\theta$=0.6, i.e., the maximum allocation for $\theta$=0.95 is 20% less than for $\theta$=0.6.

According to one embodiment of the present invention, the workload placement service has two components. A first component is a simulator component that emulates the assignment of several applications to a single resource. It traverses the traces of allocation requirements to estimate a required capacity that satisfies the resource access QoS commitments. The required capacity can be compared with resource capacity limits. A second component is an optimizing search algorithm that examines many alternative assignments and reports the best solution found for the consolidation exercise. These components of one embodiment are described further below.

Figure 6:
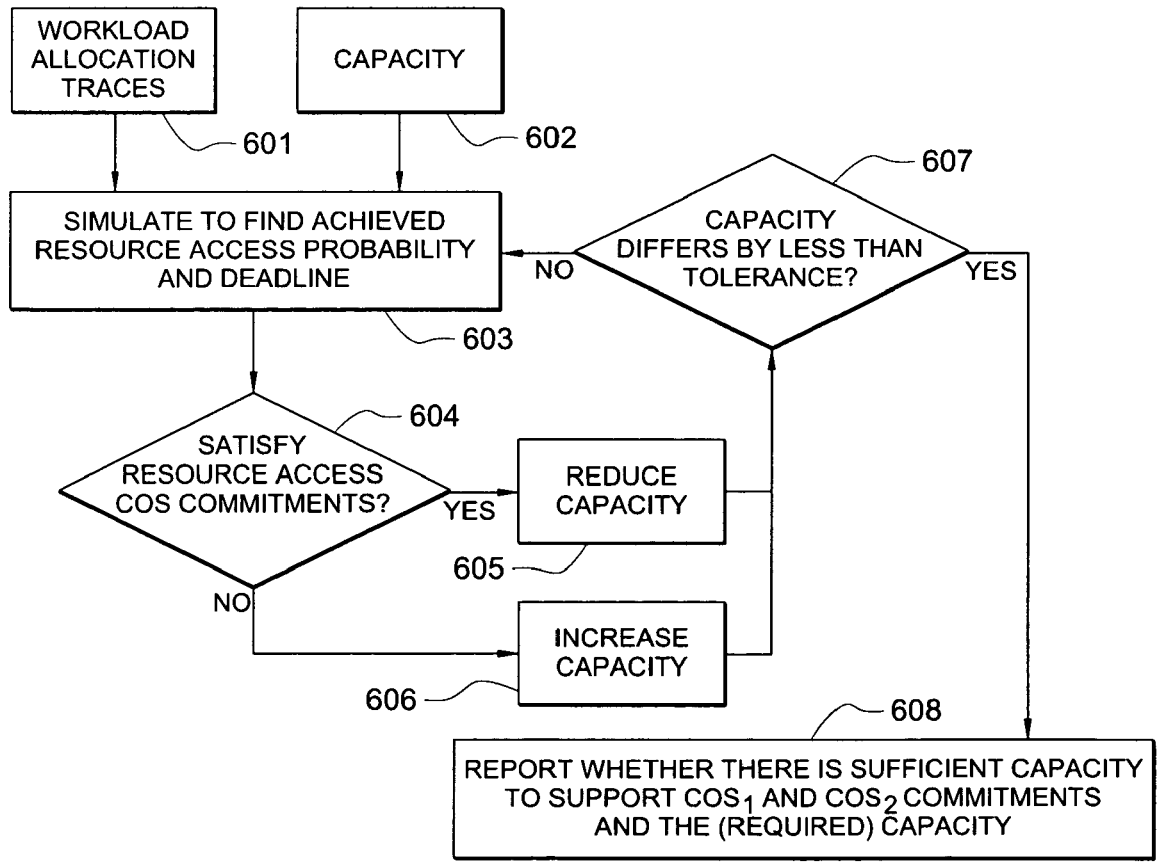
FIG. 6 shows an exemplary simulator algorithm employed by a workload placement service according to one embodiment of the present invention.

FIG. 6 shows an exemplary simulator algorithm employed by a workload placement service according to one embodiment of the present invention. Such simulator algorithm may be implemented within planning tool 14 according to certain embodiments of the present invention. The exemplary simulator considers the assignment of a set of workloads to a single resource. It replays (in block 603) the workload allocation traces 601, compares the aggregate allocations of the observations in the traces with the capacity 602 of the resource, and computes resource access COS statistics. If determined that the computed values satisfy the COS commitments, then the workloads are said to fit on the resource. A search method, e.g. a binary search, is used to find the required capacity, i.e., smallest value, for each capacity attribute such that the COS resource pool commitments are satisfied.

When two COSs are involved, the simulation component in this exemplary embodiment schedules access to capacity in the following way: Capacity is assigned to $COS_1$ first. The remaining capacity is then assigned to $COS_2$. The required capacity of each attribute is found in this exemplary embodiment as follows: First, a check is made to ensure the sum of the peak application demands associated with $COS_1$ do not exceed the capacity of the resource. If they do, then the workloads do not fit, otherwise they may fit. If the workloads may fit, then the following process is initiated: If determined in block 604 that the current capacity satisfies the COS commitments, then the algorithm reduces the capacity value for the attribute in block 605. If determined in block 604 that the current capacity does not satisfy the commitments, the algorithm increases the value for capacity up to the limit L of the attribute in block 606. The algorithm completes when it finds that the commitments cannot be satisfied or when the value for capacity changes by less than some tolerance, in block 607. The simulator component may use binary search ort other search mechanisms. Upon termination, the algorithm reports, in block 608, whether the commitments are satisfied (for each attribute). If so, the resulting value for capacity is reported as the required capacity (for each capacity attribute).

Figure 7:
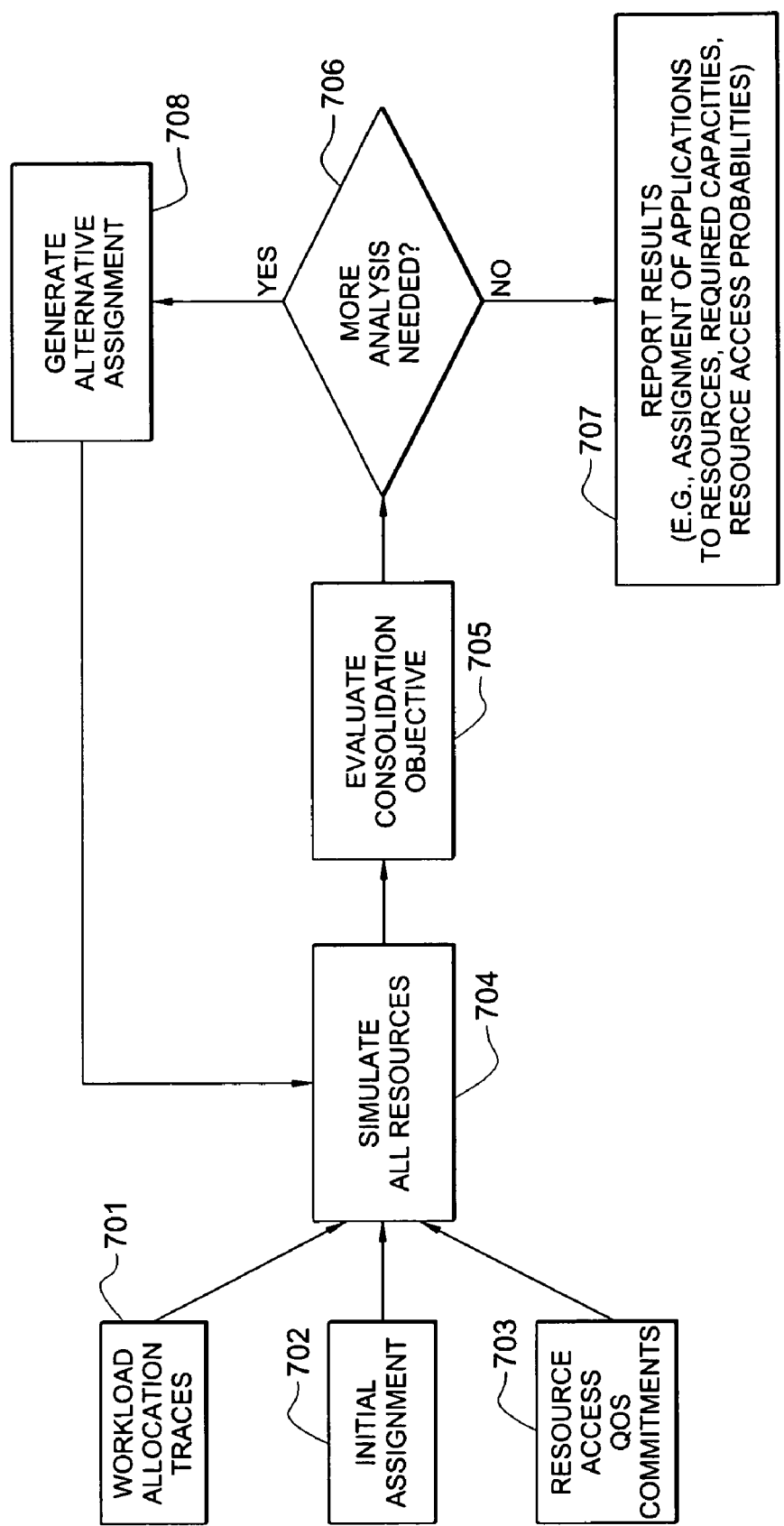
FIG. 7 shows an exemplary logical diagram illustrating the optimizing search algorithm according to one embodiment of the present invention.

FIG. 7 shows an exemplary logical diagram illustrating the optimizing search algorithm for the consolidation exercise according to one embodiment of the present invention. The resource access QoS commitments 703, workload allocation traces 701, and an initial assignment 702 of workloads to resources are the inputs of this exemplary algorithm. The behavior of each resource is simulated, in block 704. The results of the simulations are then used to compute a score for the consolidation objective function, in block 705. If determined in block 706 that there is little improvement in the score, then the algorithm reports a configuration that achieved the best score while satisfying resource access QoS commitments and terminates in block 707. Otherwise, a new configuration is enumerated in block 708 and the simulation process is repeated. A genetic algorithm may be used to guide the search.

According to one embodiment, the consolidation exercise begins with the initial configuration of the system and causes a search for a workload assignment that satisfies commitments and uses a small number of servers. A score is computed for each assignment of the workloads to resources. The score is a sum of values computed for each resource. To simplify the presentation, it may be assumed in this embodiment that each CPU in the pool has the same processing capacity but that resources may have different numbers of CPUs. The values that contribute to the score according to one embodiment are:

1: for a resource in the pool that isn't used;

$\theta(U)$: a function of utilization for a resource with required capacity R less than or equal to the capacity of the resource L, where $$U = \frac{R}{L} \text{ and } 0 < U \leq 1;$$

and

−N: for resources that are over-booked, i.e., R>L, where N is the number of application workloads assigned to the resource.

The function θ(U) provides a greater value for higher utilizations than lower utilizations. However, the function scales utilization with respect to the number of CPU resources to reflect that resources with more CPUs can operate at higher utilization levels. Let Z be the number of CPUs per server, we define θ(U) as: $\theta(U)=U^{2\times Z}$. The square term in the power exaggerates the advantages of higher utilizations (in a least squares sense), the Z term demands that servers with greater numbers of CPUs be higher utilized. The Z term is motivated by the function $$\frac{1}{1-U^Z}$$

that estimates the mean response time of clients with unit demand in an open queuing network having a single resource with Z CPUs.

A genetic algorithm having mutation and cross-over functions may be utilized in one embodiment. The mutation function associates a mutation probability with each server that is used according to its value for θ(U). The lower the value off θ(U) for a resource the greater the likelihood that the resource's application workloads will be migrated to other resources. With each mutation step, the algorithm tends to reduce the number of resources being used by one. The cross-over function mates earlier assignments in a straightforward manner. It simply takes some random number of application assignments from one assignment and the rest from the other to create a new assignment.

According to certain embodiments, the workload placement service can also be used to report on the impact of single and/or multiple failures. In one embodiment, the configuration of the consolidated system is taken as the initial configuration. This configuration is for a small number of servers as needed to support the applications with their normal mode QoS requirements. For failure modes (e.g., one server at a time), the workload placement service systematically removes one server at a time from the pool, associates its affected applications with their failure mode application QoS requirements, and repeats the consolidation algorithm. The consolidation algorithm reports whether it is possible to place all the affected applications on the remaining servers in the pool with their failure QoS requirements. If this is possible for all failures under study then the service reports that failure modes can be supported without an additional spare server. More detailed information about which applications can be supported in this way and for which failures can be combined with expectations regarding time to repair for servers, the frequency of failures, and penalties to decide on whether it is cost effective to have a spare server or not. However, in the below exemplary case study, we simply show that the use of an alternative set of application QoS constraints can result in the requirement for one less server.

We briefly present an exemplary case study to demonstrate the features of the above-described R-Opus embodiment of the present invention for a large enterprise order entry system with 26 applications. The exemplary case study is intended solely for illustrative purposes, and is not intended to limit the scope of the embodiments of the present invention in any way. The case study presents a characterization of the application workloads, results regarding the above-described portfolio approach, and workload placement results. The exemplary case study relies on four weeks of workload CPU demand traces with measurement values recorded every 5 minutes.

Figure 8:
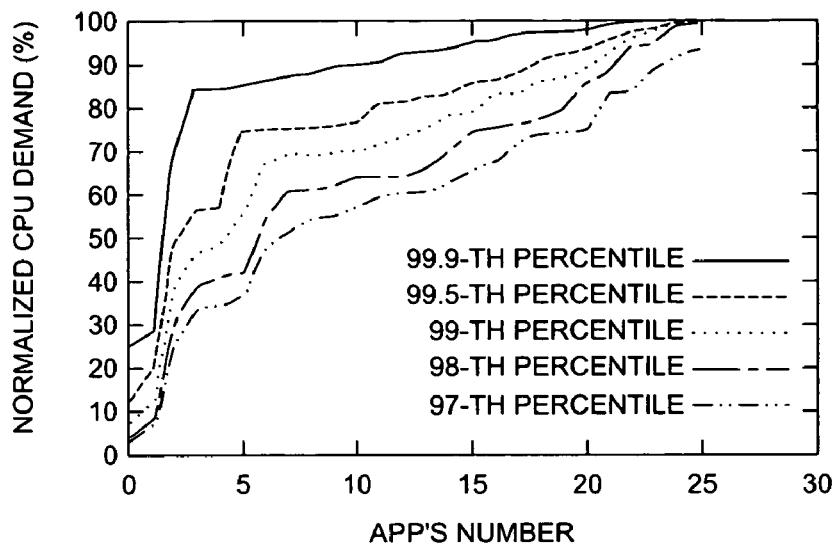
FIG. 8 shows the percentiles of CPU demand for 26 applications of an exemplary case study.

FIG. 8 shows the percentiles of CPU demand for the 26 applications of the exemplary case study. The demands are normalized as a percentage with respect to their peak values. The 100-percentile of demand corresponds to 100% normalized CPU demand. Several curves are shown that illustrate the 99.9 through 97 percentile of demand. FIG. 8 shows that 2 applications, i.e., the leftmost in the figure, have a small percentage of points that are very large with respect to their remaining demands. The leftmost 10 applications have their top 3% of demand values between 10 and 2 times higher than the remaining demands in the trace. It shows the bursty nature of demands for most of the applications under study.

In this exemplary case study, we consider the following application QoS desires:

acceptable application performance: $U^{low}=0.5$, $U^{high}=0.66$. with utilization of allocation in the range (0.5, 0.66) for 97% of measurements;

degraded application performance: for the remaining measurements $M^{degr}=3\%$ the utilization of allocation should not exceed $U^{degr}=0.9$. We consider four values for $T^{degr}$: none, 2 hours, 1 hour, and 30 min, i.e., from no additional time-limiting constraints on degraded performance to the case when degraded performance should not persist longer than 30 min.

The workloads in this exemplary case study are partitioned across the two COSs to satisfy these application QoS requirements.

Figure 9A:
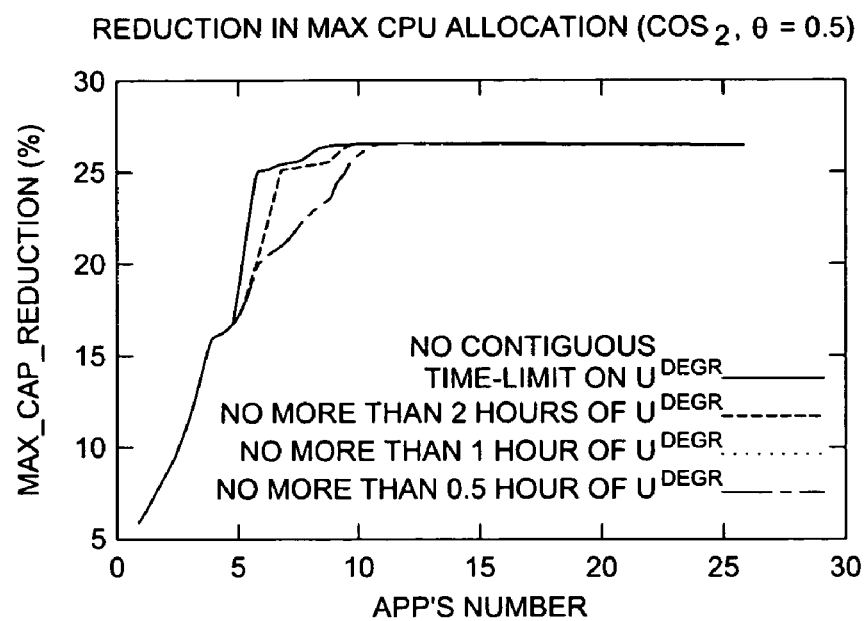
FIGS. 9A-9B show the impact of $M^{degr}$ and $T^{degr}$ parameters on maximum allocations for 26 applications under an exemplary case study.
Figure 9B:
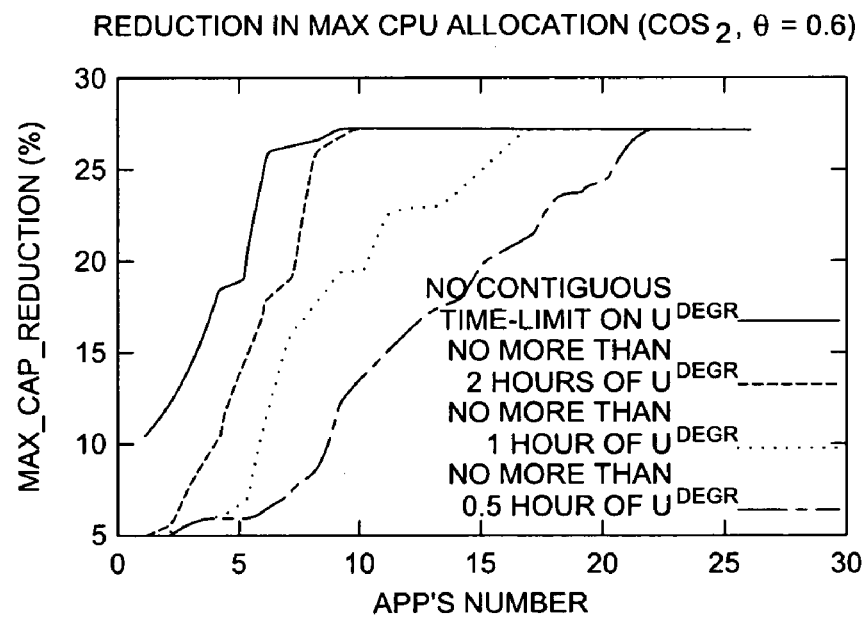

FIGS. 9A and 9B show the impact of $M^{degr}$ and $T^{degr}$ on maximum allocations for 26 applications under study and two different values for resource access probability: θ=0.95 and θ=0.6. The y-axis shows the percent reduction for the maximum allocation with $M^{degr}=3\%$ as compared to $M^{degr}=0\%$. For both values of θ, many of the 26 applications have a 26.7% in reduction for maximum allocation that corresponds to an expected upper bound on MaxCapReduction (as described by equation (5) above). Overall MaxCapReduction is affected more by $T^{degr}$ for θ=0.6 than for the higher value of θ=0.95. Again, this is consistent with our general derivations above, where we observe that under time-limiting constraints, higher values of θ lead to a smaller maximum allocation requirements.

Figure 10A:
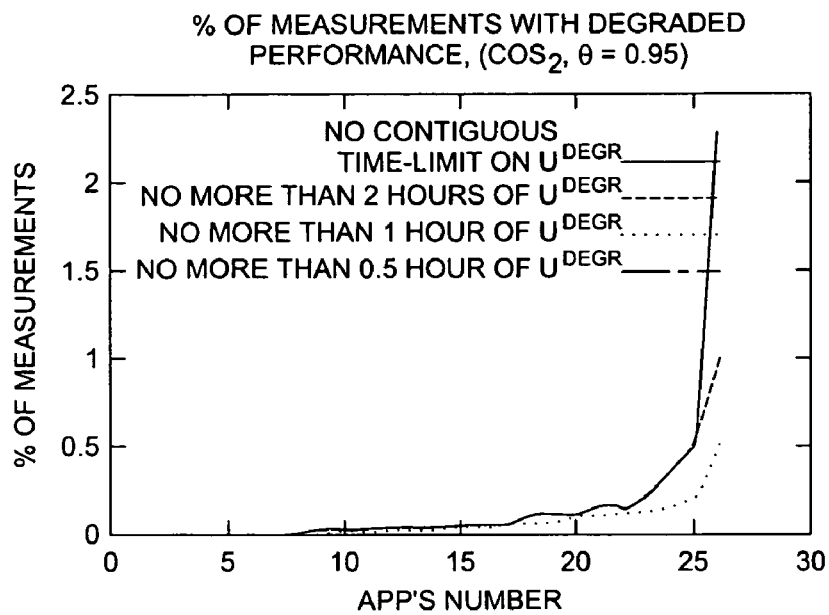
FIGS. 10A-10B show the percentage of measurements that have degraded performance in the exemplary case study.
Figure 10B:
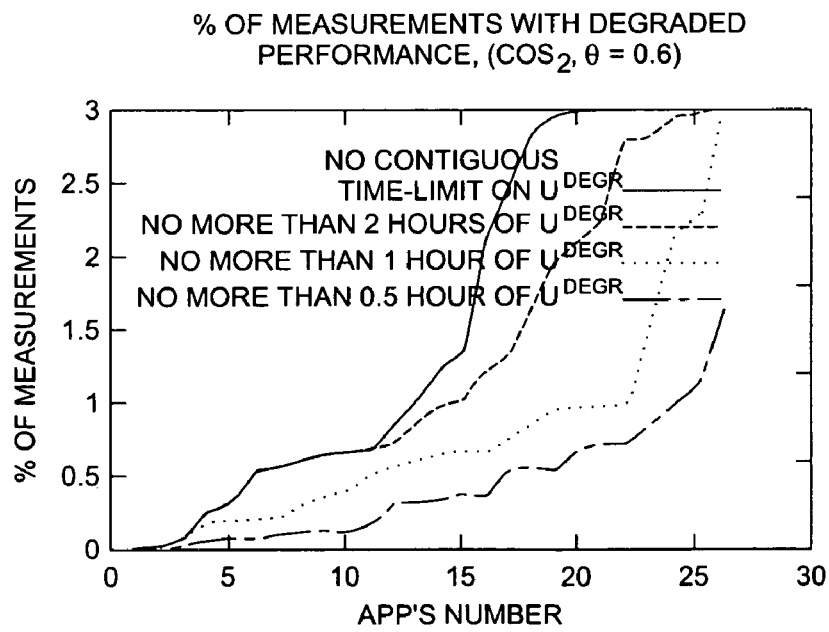

FIGS. 10A and 10B show the percentage of measurements that have degraded performance, i.e., with utilization of allocation in the range ($U^{high}$, $U^{degr}$), in this exemplary case study. While up to 3% of measurements were allowed to be in the degraded range, the additional time-limiting constraint $T^{degr}=30$ min significantly reduces the number of measurements with degraded performance: it is less than 0.5% for θ=0.95 and less than 1.5% for θ=0.6 as shown in FIGS. 10A and 10B, respectively.

To summarize, for these workloads of the exemplary case study, a small but controlled relaxation for application QoS desires can lead to up to an approximately 25% reduction in maximum allocation requirements.

We now consider the use of the workload placement service of the R-Opus embodiment of the present invention for this exemplary case study. Table I below shows the impact of $M^{degr}$, $T^{degr}$ and θ (for this case study, the resource access QoS commitment has a deadline value s that corresponds to 60 minutes) on the CPU capacity needed to satisfy the 26 application workloads. Table I shows the number of 16-way servers reported as being needed by the workload placement service, the sum of per server required capacity $C^{requ}$ and the sum of per-application peak CPU allocations $C^{peak}$. All cases had the same workload placement algorithm termination criteria and used approximately 10 minutes of CPU time on a 3.4 Ghz Pentium CPU in this exemplary case study. The required capacity values are between 37% to 45% lower than the sum of per-application peak allocations. This shows that resource sharing presents significant opportunity for reducing capacity requirements for these workloads.

Furthermore, for cases 1-3 some demands are in both $COS_1$ and $COS_2$; for cases 4-6 all demands are in $COS_2$. If all demands were associated with COS, then, because we would have to limit the sum of per-application peak allocations to the capacity of the resource, we would require at least 15 servers for case 1 and 11 servers for case 3. Thus having multiple classes of service is advantageous in this example.

TABLE I

IMPACT OF $M^{degr}$, $T^{degr}$ AND θ ON RESOURCE SHARING.

| Case | $M^{degr}$ | θ | $T^{degr}$ | Num. of 16-way servers | $C^{requ}$ CPU | $C^{peak}$ CPU |
|---|---|---|---|---|---|---|
| 1 | 0 | 0.60 | none | 8 | 123 | 218 |
| 2 | 3 | 0.60 | 30 min | 7 | 106 | 188 |
| 3 | 3 | 0.60 | none | 7 | 104 | 166 |
| 4 | 0 | 0.95 | none | 8 | 118 | 218 |
| 5 | 3 | 0.95 | 30 min | 7 | 103 | 167 |
| 6 | 3 | 0.95 | none | 7 | 104 | 166 |

We now consider the impact of $M^{degr}$ on $C^{peak}$ and then on $C^{requ}$ for this exemplary case study. With $M^{degr}$=3%, we allow 3% of the measurement points to have utilization of allocation between $U^{high}$ and $U^{degr}$.

For the cases with $T^{degr}$=none, the impact of $M^{degr}$=3% on $C^{peak}$ is identical for both values of θ. There is a reduction in $C^{peak}$ of 24%. For the cases with $T^{degr}$=30 minutes, for θ=0.6 there is a reduction in $C^{peak}$ of 14%, whereas for θ=0.95 there is a reduction of 23%. This is due to the interaction between $T^{degr}$ and θ as discussed above. Having a higher θ value appears advantageous for a resource pool operator.

We now compare the impact of $M^{degr}$=3% and $T^{degr}$=30 minutes on the values for $C^{requ}$ and $C^{peak}$ for this exemplary case study. For θ=0.6 the impact is about the same, and is a reduction of approximately 14% with respect to the $M^{degr}$=0% case. For θ=0.95, the $C^{requ}$ is reduced by 14% and $C^{peak}$ is reduced by 23% with respect to the $M^{degr}$=0 case. The workload placement service was not able to realize the same reduction in $C^{requ}$, most likely because lowered per-application peak demands do not necessarily coincide with peaks in aggregate demand.

Finally, we note that cases 1 and 4 from Table I require 8 servers, one more server than the remaining cases in this exemplary case study. Thus, from the perspective of application QoS constraints for normal and failure modes, we can offer case 1 and 4 constraints as normal mode constraints and the remaining cases as possible constraints for failure mode. In normal mode, the system would use 8 servers. In the case of a single server failure the table shows that the remaining 7 servers could support the system with the other application QoS constraints, i.e., cases 2, 3, 5, or 6. However, an appropriate workload migration technology is needed to realize the new configuration without disrupting the application processing.

To summarize for this exemplary case study, higher values of θ permit more demand to be associated with $COS_2$. This gives greater freedom to the workload placement service to overbook capacity. $M^{degr}$ has a bigger impact on $C^{peak}$ than $C^{requ}$ because not all reductions in peak application demands occur at the same times as peak aggregate allocation requirements. Greater values for θ can decrease the maximum required allocations of applications as compared to lower values for θ. Finally, even minor reductions in application QoS desires can have a big impact on system resource requirements. The appropriate use of QoS requirements can help to support workload placement exercises that deal with resource failures.

In view of the above, the exemplary R-Opus framework of one embodiment of the present invention provides a composite framework for realizing application QoS desires in shared resource pools. The framework brings together several features. It includes a method for dividing application workload demands across two workload manager allocation priorities. We have shown how this can be done to satisfy per-application QoS objectives in shared resource environments. Application owners specify application QoS requirements using a range for acceptable performance along with terms the limit acceptable degradations to this performance. These, along with resource pool resource access QoS. determine how much of each application's demands must be associated with a guaranteed allocation class of service and how much with a second class of service that offers resources with a given probability defined by a resource pool operator. A workload placement service assigns workloads to resources in a manner expected to satisfy the resource access COS objectives. The more workload that is associated with the second class of service, the greater the opportunity for the resource pool to overbook resources.

Case study results validate our technique. The results show that relatively small diminishment in application QoS requirements can lead to a significant reduction in per-application maximum allocation, e.g. 25% in our case study. Higher θ values from resource pool operators can lead to greater reductions; in particular when the time-limited degradation is employed. Having a non-guaranteed CoS greatly reduces aggregate capacity requirements when consolidating workloads to servers. The workload placement service was able to realize significant benefits from consolidation, e.g., up to 45% with respect to the sum of peak aggregate application allocation requirements, for these workloads.

Finally, the exemplary approach of certain embodiments aims to ensure that applications have utilization of allocation values that they need. This is desirable to provide application quality of service.

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Figure 11:
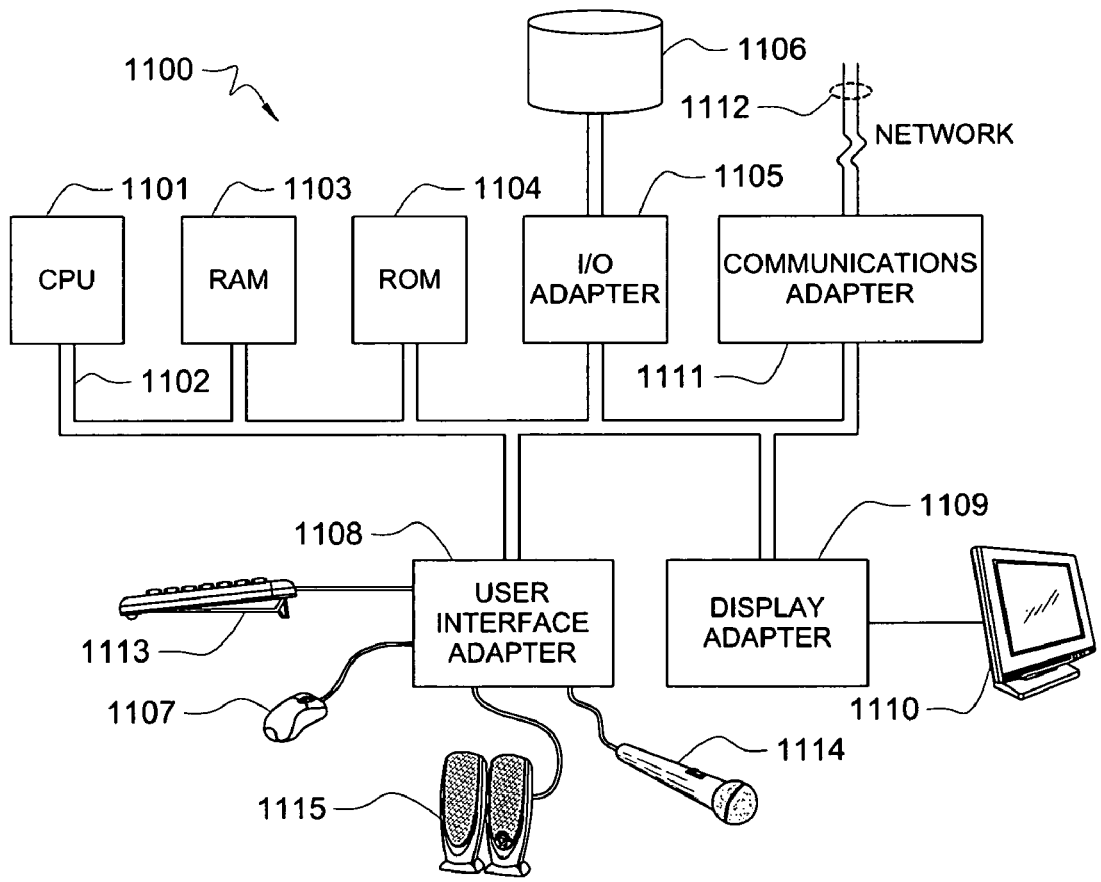
FIG. 11 shows an exemplary system on which the planning tool may be implemented according to one embodiment of the present invention.

FIG. 11 illustrates an exemplary computer system 1100 on which the planning tool 14 may be implemented according to one embodiment of the present invention. Central processing unit (CPU) 1101 is coupled to system bus 1102. CPU 1101 may be any general purpose CPU. The present invention is not restricted by the architecture of CPU 1101 (or other components of exemplary system 1100) as long as CPU 1101 (and other components of system 1100) supports the inventive operations as described herein. CPU 1101 may execute the various logical instructions according to embodiments of the present invention. For example, CPU 1101 may execute machine-level instructions according to the exemplary operational flows described above in conjunction with FIGS. 2 and 3.

Computer system 1100 also preferably includes random access memory (RAM) 1103, which may be SRAM, DRAM, SDRAM, or the like. Computer system 1100 preferably includes read-only memory (ROM) 1104 which may be PROM, EPROM, EEPROM, or the like. RAM 1103 and ROM 1104 hold user and system data and programs, as is well known in the art.

Computer system 1100 also preferably includes input/output (I/O) adapter 1105, communications adapter 1111, user interface adapter 1108, and display adapter 1109. I/O adapter 1105, user interface adapter 1108, and/or communications adapter 1111 may, in certain embodiments, enable a user to interact with computer system 1100 in order to input information, such as resource access QoS commitments and/or QoS desires of a consumer.

I/O adapter 1105 preferably connects to storage device(s) 1106, such as one or more of hard drive, compact disc (CD) drive, floppy disk drive, tape drive, etc. to computer system 1100. The storage devices may be utilized when RAM 1103 is insufficient for the memory requirements associated with storing data for operations of the planning tool (e.g., representative workload, resource access QoS commitments, consumer QoS desires, other variable values used in determining a breakpoint between different COSs). Communications adapter 1111 is preferably adapted to couple computer system 1100 to network 1112, which may enable information to be input to and/or output from system 1100 via such network 1112 (e.g., the Internet or other wide-area network, a local-area network, a public or private switched telephony network, a wireless network, any combination of the foregoing). For instance, a representative workload for a consumer may be input to system 1100 via network 1112 from a remote computer, and a computed classification (e.g., breakpoint) of the consumer's demands between different COSs may be output and communicated via network 1112 to a remote computer (e.g., to a remote scheduler for use in managing the consumer's access to resources). User interface adapter 1108 couples user input devices, such as keyboard 1113, pointing device 1107, and microphone 1114 and/or output devices, such as speaker(s) 1115 to computer system 1100. Display adapter 1109 is driven by CPU 1101 to control the display on display device 1110 to, for example, display information regarding the determined partitioning (or classification) of a consumer's demands between different COSs according to certain embodiments of the present invention.

It shall be appreciated that the present invention is not limited to the architecture of system 1100. For example, any suitable processor-based device may be utilized for implementing planning tool 14, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

What is claimed is:

1. A method comprising:
  receiving into a planning tool executed in a computer system a representative workload for a consumer;
  receiving into the planning tool quality of service objectives of the consumer which define permitted degraded performance, wherein the quality of service objectives which define permitted degraded performance include time information specifying a limit on a length of time over which the degraded performance is permissible, wherein said time information specifies a limit on a length of contiguous time that demands of the representative workload may exceed a pre-defined utilization constraint for at least one resource servicing the demands of the representation workload; and
  determining, by the planning tool based on the quality of service objectives which define permitted degraded performance, an allocation of demands of the consumer across a plurality of different classes of service (COSs).

2. The method of claim 1 wherein the permitted degraded performance comprises:
  performance of the at least one resource in servicing the demands of the representative workload, wherein utilization of the at least one resource for servicing the demands of the representative workload exceeds the pre-defined utilization constraint.

3. The method of claim 2 further comprising:
  receiving into the planning tool information defining the utilization constraint.

4. The method of claim 1 wherein said receiving into the planning tool the quality of service objectives of the consumer which define permitted degraded performance comprises:
  receiving into the planning tool first quality of service objectives of the consumer which define permitted degraded performance for a normal mode of operation in which all resources in a pool of resources to which the representative workload is assigned are operational; and
  receiving into the planning tool second quality of service objectives of the consumer which define permitted degraded performance for a failure mode of operation in which at least one of the resources in the pool of resources to which the representative workload is assigned is not operational.

5. The method of claim 4 wherein said determining, by the planning tool, the allocation of the demands of the consumer across the plurality of different COSs comprises:
  determining, by the planning tool, a first allocation of the demands of the consumer across the plurality of different COSs for the normal mode of operation; and
  determining, by the planning tool, a second allocation of the demands of the consumer across the plurality of different COSs for the failure mode of operation.

6. The method of claim 1 further comprising:
  outputting, by said planning tool, said determined allocation, wherein said outputting comprises at least one selected from the group consisting of presenting to a display, outputting to data storage, and communicating to an application.

7. The method of claim 1 wherein said plurality of different COSs comprise:
  a first COS having guaranteed resource access for servicing demand allocated to said first COS; and
  a second COS having non-guaranteed resource access for servicing demand allocated to said second COS.

8. The method of claim 7 further comprising:
  receiving, by said planning tool, input specifying a particular parameter, wherein said second COS has a resource access probability of no worse than said particular parameter.

9. The method of claim 1 further comprising:
  receiving, by said planning tool, resource access quality of service (QoS) commitments which define a permitted degree of overbooking for resources in a resource pool to which the representative workload is assigned.

10. The method of claim 9 wherein said receiving, by said planning tool, the resource access QoS commitments comprises:
receiving, by said planning tool, information defining a resource access probability for a non-guaranteed COS; and
receiving, by said planning tool, information specifying a deadline by which demands of the representative workload that are not satisfied upon request are to be satisfied.

11. The method of claim 9 wherein the determining, by the planning tool, the allocation of demands of the consumer across the plurality of different COSs comprises:
determining the allocation of the demands of the consumer across the plurality of different COSs that satisfies both the received quality of service objectives of the consumer and the received resource access QoS commitments.

12. The method of claim 1, wherein the representative workload is an estimation of a future workload for the consumer, and wherein the representative workload is based on a historical workload for the consumer.

13. A method comprising:
receiving into a planning tool executed in a computer system a representative workload for a consumer;
receiving into the planning tool quality of service objectives of the consumer which define permitted degraded performance, wherein the quality of service objectives which define permitted degraded performance include time information specifying a limit on a length of time over which the degraded performance is permissible, and wherein the quality of service objectives further include information specifying a permitted percentage of demands in the representative workload that may exceed a pre-defined utilization constraint for at least one resource servicing the demands of the representative workload; and
determining, by the planning tool based on the quality of service objectives which define permitted degraded performance, an allocation of demands of the consumer across a plurality of different classes of service (COSs).

14. A non-transitory computer-readable medium storing code executable in a computer system, the code comprising:
code for receiving a representative workload for a consumer;
code for receiving information defining desired performance for servicing the representative workload of the consumer, wherein the information comprises
a) information defining a constraint on utilization of at least one resource in servicing demands of the representative workload, and
b) information defining a permissible time-limited degraded performance specifying a limit on a length of contiguous time during which the defined constraint on utilization of the at least one resource can be exceeded in servicing demands of the representative workload; and
code for determining a breakpoint for partitioning resource demands of said representative workload across a plurality of different classes of service (COSs) in compliance with said information defining the desired performance.

15. The computer-readable medium of claim 14, wherein said plurality of different COSs comprise:
a first COS having guaranteed resource access for servicing demand allocated to said first COS; and
a second COS having non-guaranteed resource access for servicing demand allocated to said second COS.

16. The computer-readable medium of claim 14 wherein said code for receiving information defining desired performance for servicing the representative workload of the consumer comprises:
a) code for receiving said information defining desired performance for a normal mode of operation in which all resources in a pool of resources to which the representative workload is assigned are operational; and
b) code for receiving said information defining desired performance for a failure mode of operation in which at least one of the resources in the pool of resources to which the representative workload is assigned is not operational; and
wherein said code for determining the breakpoint comprises:
a) code for determining a first breakpoint for partitioning resource demands of said representative workload between the plurality of different COSs in compliance with said information defining the desired performance for the normal mode of operation; and
b) code for determining a second breakpoint for partitioning resource demands of said representative workload between the plurality of different COSs in compliance with said information defining the desired performance for the failure mode of operation.

17. The computer-readable medium of claim 14, wherein the specified length of time is a contiguous length of time.

18. A system comprising:
at least one central processing unit (CPU);
a scheduler for at least one resource, said scheduler executable on the at least one CPU to schedule access to the at least one resource for servicing demands of a consumer based at least in part on a plurality of different classes of service (COSs) for the demands; and
a planning tool executable on the at least one CPU to:
receive a representative workload of the consumer;
receive information defining desired performance for servicing the representative workload of the consumer, wherein the information comprises
a) information defining a constraint on utilization of the at least one resource in servicing demands of the representative workload, and
b) information defining a permissible time-limited degraded performance specifying a limit on a length of contiguous time during which the defined constraint on utilization of the at least one resource can be exceeded in servicing demands of the representative workload; and
determine at least one breakpoint for partitioning resource demands of the representative workload across the plurality of different COSs in compliance with said information defining the desired performance.

19. The system of claim 18 wherein the determined at least one breakpoint is used by the scheduler for servicing the demands of the consumer.

20. The system of claim 18 wherein said plurality of different COSs comprise:
a first COS having guaranteed resource access for servicing demand allocated to said first COS; and
a second COS having non-guaranteed resource access for servicing demand allocated to said second COS.

21. The system of claim 18 wherein the information defining the permissible time-limited degraded performance specifying the length of time during which the defined constraint on utilization of the at least one resource can be exceeded in servicing demands of the representative workload comprises:

information defining a permitted percentage of demands in the representative workload that may exceed the defined constraint on utilization of the at least one resource; and time information defining the length of time.

22. The system of claim 18, wherein the specified length of time is a contiguous length of time.

* * * * *